(12) United States Patent
Popp et al.

(10) Patent No.: US 9,622,503 B2
(45) Date of Patent: Apr. 18, 2017

(54) SEMI-SOLID FOOD CONCENTRATE IN THE FORM OF A PASTE OR A GEL

(75) Inventors: Alois Konrad Popp, Vlaardingen (NL); Sabrina Silva Paes, Vlaardingen (NL); Robert Vreeker, Vlaardingen (NL)

(73) Assignee: Conopco Inc., Englewood Cliffs, NJ (US)

( * ) Notice: Subject to any disclaimer, the term of this patent is extended or adjusted under 35 U.S.C. 154(b) by 272 days.

(21) Appl. No.: 13/979,209

(22) PCT Filed: Dec. 16, 2011

(86) PCT No.: PCT/EP2011/073020
§ 371 (c)(1),
(2), (4) Date: Jul. 12, 2013

(87) PCT Pub. No.: WO2012/097934
PCT Pub. Date: Jul. 26, 2012

(65) Prior Publication Data
US 2013/0280405 A1    Oct. 24, 2013

(30) Foreign Application Priority Data
Jan. 17, 2011 (EP) .................................. 11151171

(51) Int. Cl.
| A23L 1/40 | (2006.01) |
|---|---|
| A23L 29/212 | (2016.01) |
| A23L 29/238 | (2016.01) |
| A23L 29/244 | (2016.01) |
| A23L 29/256 | (2016.01) |
| A23L 29/269 | (2016.01) |
| A23L 27/60 | (2016.01) |
| A23L 23/00 | (2016.01) |
| A23L 23/10 | (2016.01) |

(52) U.S. Cl.
CPC .............. *A23L 1/40* (2013.01); *A23L 23/00* (2016.08); *A23L 23/10* (2016.08); *A23L 27/60* (2016.08); *A23L 29/212* (2016.08); *A23L 29/238* (2016.08); *A23L 29/244* (2016.08); *A23L 29/256* (2016.08); *A23L 29/27* (2016.08); *A23L 29/272* (2016.08)

(58) Field of Classification Search
CPC ........ A23L 1/05; A23L 1/0532; A23L 1/0522; A23L 1/0526; A23L 1/0524; A23L 1/054; A23L 1/0541; A23L 1/05625; A23L 29/27; A23L 29/29; A23L 29/212; A23L 29/238; A23L 29/244; A23L 29/256; A23L 29/269; A23L 23/10
USPC ................ 426/573, 575, 576, 589
See application file for complete search history.

(56) References Cited

U.S. PATENT DOCUMENTS

| 4,746,528 A | 5/1988 | Prest et al. |
|---|---|---|
| 5,709,900 A | 1/1998 | Miller et al. |
| 8,323,718 B2 | 12/2012 | Kopesky et al. |
| 2005/0181019 A1 | 8/2005 | Palmer et al. |
| 2006/0204454 A1* | 9/2006 | Veerman ............... A23C 9/1307 424/50 |
| 2007/0196496 A1* | 8/2007 | Farber .................. A61K 31/718 424/488 |
| 2008/0299251 A1* | 12/2008 | Clark ..................... A23K 1/001 426/7 |
| 2008/0311247 A1 | 12/2008 | Inoue et al. |
| 2008/0311250 A1* | 12/2008 | Achterkamp ........... A23L 1/054 426/62 |
| 2008/0311251 A1 | 12/2008 | Achterkamp et al. |
| 2009/0148583 A1* | 6/2009 | Achterkamp ............. A23L 1/40 426/578 |
| 2013/0280405 A1 | 10/2013 | Popp et al. |

FOREIGN PATENT DOCUMENTS

| CN | 1123516 | 5/1996 | |
|---|---|---|---|
| CN | 101068477 | 11/2007 | |
| CN | 101322539 | 12/2008 | |
| CN | 101662946 | 3/2010 | |
| DE | WO 2008068138 A1 * | 6/2008 | ........... A23L 1/0023 |
| EP | 2005838 A1 | 12/2008 | |
| WO | WO03015538 A1 | 2/2003 | |
| WO | WO2004049822 A1 | 6/2004 | |
| WO | WO2007068402 A1 | 6/2007 | |
| WO | WO2007068483 A1 | 6/2007 | |
| WO | WO2007068484 A1 | 6/2007 | |
| WO | WO2007113111 A1 | 10/2007 | |

(Continued)

OTHER PUBLICATIONS

Rutgers et al., Theh Plasticisation Effect of Glycerol and Water on the Gelatinisation of Wheat Starch, International Symposium on Food Rheology and Structure, 2003, pp. 297-301.
Zhao Mouming et al., Study on Synergistic Interaction and Stability of Salt Tolerance Between Xanthan Gum and Other Common Foods Gums, Food & Fermentation Industries, Jan. 1, 1999, pp. 10-14; with abstract., vol. 25, No. 2, CN.
IPRP2 in PCTEP2011072417, Apr. 16, 2013, WO.
IPRP2 in PCTEP2011072857, Feb. 25, 2013, WO.
Search Report in EP11151163, Jul. 29, 2011, EP.
Search Report in EP11151168, Apr. 5, 2011, EP.
Search Report in PCTEP2011072417, Mar. 20, 2012, WO.
Search Report in PCTEP2011072857, Feb. 3, 2012, WO.

(Continued)

*Primary Examiner* — Jyoti Chawla
(74) *Attorney, Agent, or Firm* — Greenberg Traurig, LLP

(57) ABSTRACT

A semi-solid food concentrate in the form of a gel or a paste comprising a salt-sensitive gum, salt in an amount sufficient to keep the salt-sensitive gum in a salted-out state, a salt-stable structuring material in an amount effective to provide a semi-solid food concentrate, water, which semi-solid food concentrate, after dilution in an aqueous liquid, the aqueous liquid being water, can result in a ready-to-eat end product comprising: from 0.1 to 2.5 wt % of salt and from 0.01 wt % to 3.5 wt % of a salt-sensitive gum. the ready-to-eat end product having a viscosity of higher than 15 mPa·s at 20° C., and wherein the salt-stable gelling system is not konjac mannan alone.

17 Claims, No Drawings

(56) References Cited

FOREIGN PATENT DOCUMENTS

| WO | WO2008068138 | 6/2008 |
|---|---|---|
| WO | WO2008134306 A1 | 11/2008 |
| WO | WO2008151850 | 12/2008 |
| WO | WO2008151851 A2 | 12/2008 |
| WO | WO2008151852 | 12/2008 |
| WO | WO2008151853 | 12/2008 |
| WO | WO2011076528 A1 | 6/2011 |
| WO | WO2012084843 | 6/2012 |
| WO | WO2013021190 | 2/2013 |

OTHER PUBLICATIONS

Written Opinion in EP11151163, Jul. 29, 2011, EP.
Written Opinion in EP11151168, Apr. 5, 2011, CT.
Written Opinion in EP11151171, Apr. 6, 2011, EP.
Written Opinion in PCTEP2011072417, Mar. 20, 2012, WO.
Written Opinion in PCTEP2011072857, Feb. 3, 2012, WO.
Knorr Bouillon Pur Huhn, Ciao, XP-002654429, pp. 1-4.
Pure Vegetable Stock, URL:http://www.gnpd.com, Apr. 2010, XP-002654428, 3.
Draget K.I., Aliginates, Handbook of hydrocolloids, 2000, Chapter 22, ISBN1-85573-501-6, pp. 379-395.
Gunaratne et al., Thermal, pasting, and gelling properties of wheat and potato starches in the presence of sucrose, glucose, glycerol, and hydroxypropyl B-cyclodextrin, Carbohydrate Polymers, Mar. 9, 2007, vol. 70, 112-122.
Katzbauer et al, Properties and applications of xanthan gum, Polymer Degradation and Stability, Jun. 19, 1997, vol. 59, Elsevier, 81-84.
Kovacs et al, Useful Incompatibility of Xanthan Gum with galactomannans, Food Technology, Mar. 1, 1973, pp. 26 27 28 30.
Yoshimura et al., Rheological studies on mixtures of corn starch and konjac-glucomannan, Carbohydrate Polymers, Oct. 27, 1997, vol. 35, pp. 71-79.
Phillips et al., Handbook of hydrocolloids, Handbook of hydrocolloids, 2009, 112-114.
International Preliminary Report on Patentability in PCT application PCT/EP2011/073020, dated Apr. 16, 2013.
EP Search Report in EP application EP 11 15 1171, dated Apr. 6, 2011.
PCT International Written Opinion PCT/EP2011/073020.
PCT International Search Report in PCT application PCT/EP2011/073020, dated Mar. 20, 2012.
Co-Pending application Popp et al., U.S. Appl. No. 13/979,208, filed Jul. 11, 2013.
Co-Pending application Perrine et al., U.S. Appl. No. 13/979,216, filed Jul. 11, 2013.
G.O. Phillips et al., Food Science, Handbook of Hydrocolloids, 2000, pp. 41-43, ., Woodhead Publishing.

\* cited by examiner

SEMI-SOLID FOOD CONCENTRATE IN THE FORM OF A PASTE OR A GEL

The present invention relates to a semi-solid food concentrate. It further relates to a process to prepare said semi-solid food concentrate. It further relates to the use of the semi-solid food concentrate to prepare a ready-to-eat end product like a soup, a sauce, or a gravy.

BACKGROUND OF THE INVENTION

A convenient way of preparing a soup, a sauce or gravy is by diluting a concentrated product in water. In case the liquid savory product is derived from a dry concentrated product containing starch, upon dilution of the concentrate in water, usually after applying heat, the starch becomes activated and provides a viscous liquid food product. Traditional concentrates are dry concentrates, for example in the form of cubes or granules. A format of savory food concentrates which is appreciated nowadays by consumers, is a moist, non-liquid concentrate, for example in the form of a gel or a paste. A gel or a paste allows addition of water containing or liquid ingredients, which contributes to the perception of freshness of the concentrate. WO2007/113111 discloses a savory food composition comprising at least one pre-gelatinised starch and at least one cook-up starch. The texture may be liquid or may be a dry powder.

A savory food composition has been described which provides binding activity upon dilution of the concentrate. WO2004/049822 discloses a shelf-stable fluid concentrated composition comprising starch dispersed in an aqueous basis wherein the starch is in an unswollen state. The viscosity of the product is lower than 1500 Pas and has a pourable or spoonable texture. Upon dilution in hot water the product forms a thickened liquid, like a sauce.

It was observed that the use of starch provides several undesired complications. Given the conventional dilution rates, a relatively high amount of starch, e.g. 30 wt % should be present to provide the desired viscosity in the ready-to-eat end product resulting after dilution, such as for example a soup, a sauce or gravy. High amounts of starch result in less formulation flexibility, as less space is present for other ingredients. A high starch amount may result in a viscosity of the ingredient mixture, during preparation of the food concentrate, which is too high, for example due to the high starch powder content. Such a high viscosity requires more energy uptake by the mixture during mixing. A further disadvantage of the use of starch is that the starch should not be activated (gelatinised) during production of the food concentrate, as in that case, most of its viscosity enhancing capacity is lost when the product is diluted and the concentrate forms lumps after dilution. Therefore, when starch is used, it is usually added at a relatively low temperature during production of the concentrate. This forms a complication when a structuring agent is present in the composition which comprises gelling agents, =. Gelling agents are normally functionalised (activated) at relatively high temperatures (e.g. >60° C.), and heating of the product results in gelatinisation of the starch. Cooling to a temperature which might allow addition of the starch, results in a limited temperature frame to add starch, if this is possible at all, as the gelling agents solidify upon temperature reduction. Sterilisation or pasteurisation of starch-containing products forms a problem, as during such processes the starch becomes gelatinised. From a consumer perspective, starch might not be preferred as during dilution in hot water, heating of starch forms a risk for formation of lumps in the ready-to-eat end product.

Furthermore, the ready-to-eat end product comprising the starch needs to be cooked-up for some time, to activate the starch, in order to obtain the thickening effect of starch. This can be experienced as cumbersome by consumers and may form a quality risk, if heating is carried out too long or too short. In addition, the taste of starch may often not be appreciated. Furthermore, consumption of starch results in an additional intake of calories, which is often not preferred by consumers. Finally, the presence of relatively high amounts of starch may result in an opaque appearance of the concentrated product, which may not be desired for some applications.

It was observed that the compositions from the art show several disadvantages. Concentrates as described in the art did not allow for easy unit dosing, as they were liquid. Many of them would not be considered as 'natural' by consumers, because of their dry appearance.

SUMMARY OF THE INVENTION

Hence, there is a need in the art for a semi-solid food concentrate, which upon dilution in an aqueous liquid provides a viscous ready-to-eat end product, without the drawbacks mentioned above. The viscosity in the ready to eat product is preferably present at 20 and/or 70 degrees C., preferably at 20 and/or 50 and/or 70 degrees C. The semi-solid food concentrate should not be too hard to allow relatively easy removal from a packaging or easy dosing with a spoon. Furthermore, semi-solid food concentrate should allow for an efficient production process. This is especially important when unit dose formats are used. The production process is preferably relatively quick. A semi-solid food concentrate with a homogenous texture and ingredient distribution is desired.

Surprisingly, these complications were overcome by a product according to the invention. The present invention relates to a semi-solid food concentrate comprising:
  a salt-sensitive gum,
  salt in an amount sufficient to keep the salt-sensitive gum in a salted-out state,
  a salt-stable structuring material in an amount effective to provide a semi-solid food concentrate,
  water,
  which semi-solid food concentrate, after diluting in an aqueous liquid, can result in a ready-to-eat end product comprising:
  from 0.1 to 2.5 wt % of salt,
  from 0.01 wt % to 3.5 wt % of a salt-sensitive gum.
  A semi-solid food concentrate preferably comprises:
  a salt-sensitive gum selected from gellan, alginate or a mixture thereof whereby preferably gellan is present in an amount of from 0.1, preferably of from 0.2 to 2.0 wt % and preferably alginate in an amount of between 2 and 8 wt %, based on the weight of the semi-solid food concentrate,
  salt in an amount sufficient to keep the salt-sensitive gum in a salted-out state, whereby the salt is NaCl and NaCl is present in an amount of from 9 wt % to 20 wt %, even more preferably in an amount of from 9 wt % to 18 wt %, based on the weight of the semi-solid food concentrate,
  a salt-stable structuring material in an amount effective to provide a semi-solid food concentrate, whereby the salt-stable structuring material is preferably xanthan gum and locust bean gum, preferably present in a total amount of from 0.1 wt % to 10 wt %, more preferably in an amount of from 0.2 wt % to 7 wt %, even more preferably in an amount of from 0.5 wt % to 5 wt %, most preferably in an amount of from 0.8 wt % to 3 wt %, based on the weight of the water content of the semi-solid food concentrate, water, preferably in an amount of from 20 wt % to 91.5 wt %, more preferably, in an amount of from 30 wt % to 70 wt %, even more preferably from 40 wt % to 65 wt % (based on the weight of the total semi-solid food concentrate), which semi-solid food concentrate, after diluting in an aqueous liquid, preferably between 8 and 20 times, can result in a ready-to-eat end product comprising:

from 0.1 to 2.5 wt % of salt, from 0.01 wt % to 3.5 wt % of a salt-sensitive gum, whereby the ready-to-eat end product has a viscosity of higher than 15 mPa·s at 20 degrees C., preferably at 50 degrees C., and preferably a viscosity of higher than 15 mPa·s at 70 degrees C.

In a further aspect, the invention relates to process to prepare a semi-solid food concentrate comprising a salt-sensitive gum, salt in an amount sufficient to keep the salt-sensitive gum in a salted-out state, a salt-stable structuring material in an amount effective to provide a semi-solid food concentrate, water, which semi-solid food concentrate, after diluting in an aqueous liquid, can result in a ready-to-eat end product comprising:

from 0.1 to 2.5 wt % of salt, from 0.01 wt % to 3.5 wt % of a salt-sensitive gum, the process comprising the steps of:

a) providing a mixture comprising water, salt, salt-sensitive gum and salt-stable structuring material, b) packaging the mixture of step a), to result in a semi-solid food concentrate.

In a further aspect, the present invention relates to a process to prepare a ready-to-eat end product, comprising the step of diluting at least part of a semi-solid food concentrate according to the invention in an aqueous solution.

In a further aspect, the present invention relates to the use of a semi-solid food concentrate according to the invention to prepare a gravy, a soup, or a sauce.

DETAILED DESCRIPTION OF THE INVENTION

The present invention relates to a semi-solid food concentrate. "Semi-solid food concentrate" is intended to mean here "an aqueous food concentrate, which is not liquid". The product preferably does not flow. Preferably, the semi-solid food concentrate is in the form of a gel or a paste.

It may be preferred that the semi-solid food concentrate is in the form of a gel. Preferably, in this case, deformation under application of sufficient pressure is predominantly elastic deformation. By choosing the amount of the gelling system in the structuring material the desired rheology can be obtained by a person skilled in the art.

It may also be preferred that the semi-solid food concentrate is in the form of a paste. In this case, deformation caused by applying a pressure to the concentrate preferably remains to a major extent after removing the load.

Preferably, the semi-solid food concentrate of the present invention is meant to describe a semi-solid food concentrate having a ratio of elastic modulus G' to viscous modulus G" of higher than 1, i.e. the elastic modulus G' is higher than the viscous modulus G". (see for example "Das Rheologie Handbuch, Thomas Mezger, Curt R. Vincentz-Verlag, Hannover, 2000"). The elasticity is preferably higher than the viscosity. The preferred rheology parameters G' and G" generally can be achieved in an aqueous environment when sufficient structuring material is used in the formulation. For the present invention, a too hard product is not preferred, as this may be too brittle and may be damaged when removed from the packaging. A too hard product may show a tough texture, which compromises removal from the packaging or spoonability. Moreover, during production of such a product, the ingredient mixture may show a high viscosity, which results in a relatively inefficient production process, e.g. requiring much energy during mixing.

In the present invention, preferably, the semi-solid food concentrate has a G' of between 30 and 50000 Pa. Preferably, G' is lower than 50000 Pa, more preferably lower than 10000 Pa, even more preferably lower than 5000 Pa, even more preferably lower than 2000 Pa, even more preferably lower than 1000 Pa, even more preferably lower than 500 Pa, even more preferably lower than 400 Pa, most preferably lower than 350 Pa. G' is preferably higher than 30, more preferably higher that 50 Pa, even more preferably higher than 80 Pa.

The absolute value of the viscous modulus G" is preferably higher than 1, more preferably higher than 5, even more preferably, higher than 10 Pa.

Preferably, the ratio of the elastic modulus G' to the viscous modulus G" is higher than 1 and lower than 1000. The ratio of G'/G" is preferably higher than 2, more preferably it is higher than 3. Preferably, this ratio is lower than 1000, more preferred lower than 200, even more preferably, lower than 100, most preferably lower than 50.

The above given values are measured under the following circumstances:

a maturation time of at least 12 h at 20° C. and a pressure of 1 atm, measurement temperature of 20° C., an oscillatory frequency of 1 Hz and a strain in the linear viscoelastic region (e.g. 0.1-0.5%) as defined by a strain sweep test.

This set of parameters refers to a standard oscillatory test conducted with a standard state of the art low deformation rheometer as commercially available from e.g. Bohlin or TA Instruments.

Preferably the product of the invention has a yield point (also known as yield stress or yield value). The presence of a yield point is preferably in addition to G'>G". A material with a yield point begins to flow only when external forces (Fext) acting on the material are larger than the internal forces (Fint) of the material. Below the yield point the material shows elastic behavior and behaves like a soft but rigid solid, exhibiting under load only very small degree of deformation that does not remain after removing the load. The material only begins to flow only when Fext>Fint. Dispersions with a high concentration of solid particles (pastes) and gels are examples of materials showing yield point. Materials with yield point often show plastic behavior. (Thomas Mezger, The Rheology Handbook, for users of oscillatory rheometers. $2^{nd}$ revised edition, Vincentz, Hannover, 2006)". Yield stress behavior of flow is demonstrated in FIG. 3.21 of Thomas Mezger, The Rheology Handbook, for users of oscillatory rheometers. $2^{nd}$ revised edition, Vincentz, Hannover, 2006.

The person skilled in the art can analyze elastic and plastic deformation for example by using a rheometer or a texture analyser.

To provide a composition which allows relatively easy portioning with a spoon and/or enables easy removal from the packaging, the semi-solid food concentrate according to the invention is preferably not too hard. Preferably, the hardness of the semi-solid food concentrate is higher than 10 g, more preferably higher than 15 g, even more preferably higher than 20 g, most preferably higher than 30 g; and is lower than 1500 g, more preferably lower than 500 g, even more preferably lower than 200 g, most preferably lower than 100 g. It can be for example of from 10 to 200 g, preferably of from 30 to 200 g. The hardness or gel strength is measured by a texture analysis, using the following method:

A texture analyser from Microstable Sytems, model TA XT2 with 5 kg load cell is used. A plunger is applied with the following characteristics: diameter: 0.5 inches, means 12.7 mm, height 35 mm, plane surface, sharp edges, plastics material. The sample containers may have an influence on the measured results, therefore, the chosen container should always be of the same dimensions. In this analysis, plastic containers are used with the following dimensions: diameter bottom 5 cm; diameter top 6.3 cm; height of the container: 7.3 cm; Filling height: 5 cm). After preparation, samples are stored at 5° C. to allow quick gelling, within 24 hours. Measurements are done within 1 week after preparation and the product has to be at 20° C. at least 24 hours before measurement. The TA-parameters are: Pre speed 1 mm/s, Test speed 0.5 mm/s, Re speed 10 mm/s, Distance 15 mm, Trigger Auto, Force 0.5 g, Recording is stopped at target. The measured result taken from the recorded graph is the force at 10 mm penetration depth, expressed in grams.

The present invention relates to a semi-solid food concentrate and preferably shows the preferred elasticity (G') and viscosity (G") moduli and characteristics as described above. A semi-solid food product is preferably not pourable at ambient temperature, like a salad dressing or ketchup. The semi-solid food concentrate will usually have a smooth surface appearance. When removed from its packaging, the semi-solid food concentrate is preferably shape-stable, i.e. it can support its own weight and hold its shape, under gravity at 20° C. This should be understood that after removal from the packaging a small deformation in shape under gravity at 20° C. is allowed. The product preferably does preferably not flow. The semi-solid food concentrate can preferably deform (easily) under pressure. It may be preferred that the semi-solid food concentrate is in the form of a gel.

A gel in the context of the present invention is not a paste, like e.g. peanut butter or tomato puree, or has preferably not the consistency of a dough, which can be elongated and stretched considerably without breaking. The semi-solid food concentrate in the form of a gel preferably will break upon stretching. It cannot be reconstituted again after breakage by sticking the pieces together, which would for example be possible for a paste. Sticking together should be interpreted as contacting the pieces, possibly with some mechanical pressure like kneading, but without the help of sticking agent or temperature changes resulting in e.g. freezing or melting of the gel.

Salt-Sensitive Gums

It was found that a semi-solid food concentrate which provides a viscous ready to eat end product upon dilution, and which is not too hard and which allows for a relatively uncomplicated production method could be provided by using e.g., a salt-stable structuring material and inactive salt-sensitive gum.

It was surprisingly observed that when salt-stable gum, for example xanthan gum, was used in an amount to provide the desired viscosity upon dilution (for example a viscous sauce or gravy), the semi-solid food concentrate could not be prepared without problems. The energy needed during the production process became too much because of the very high viscosity of the ingredient mixture (Example 3). Even if production would be possible, a semi-solid food concentrate would result with a harder texture, which easily shows complications when the product is removed from its packaging.

In the absence of salt, a salt sensitive gum shows texture enhancing behaviour in an aqueous solution. With texture enhancing behaviour is meant that when the salt sensitive gum is dissolved in an aqueous solution, it is able to form a gel or thicken the aqueous solution. For some gums a low concentration of counter ions, like $Ca^{2+}$ might be necessary, as known to a person skilled in the art. At a salt concentration above a critical concentration, the salt-sensitive gum is not able to form a gel or to provide thickening, at least not to the extent observed in the absence of salt. This phenomenon may be described as "salting-out". In the salted-out state, the salt-sensitive gum may be present as a precipitate in the semi-solid food concentrate because of the relatively high salt content. This is for example observed when the salt-sensitive gum is alginate or gellan. The precipitated material may for example comprise dispersed particles. The dispersed particles may be crystals, deformable solid particles, amorphous structures and mixtures thereof. Salted-out material may in some cases act as active filler and as such show some reinforcement of the food concentrate, but does not contribute to the gel network (Van Vliet, 1988, Rheological properties of filled gels. Influence of filler matrix interaction, Colloid Polym Sci 266:518-524. The salt-sensitive gums are preferably homogenously dispersed but not dissolved in the semi-solid food concentrate of the present invention The salted out material can be observed for example as particles with a particle size of from 30 to 400 micron. The structure in the form of a gel enables a stable homogenous dispersion of the salted-out gum in the food concentrate.

A salt sensitive gum in the salted out state in general does not dissolve and stays precipitated as particles even if the gelled food composition is heated up to temperatures above the melting point of the salt stable gum. This can be observed for example by heat stage light microscopy.

For the purpose of the present invention, "salted out" may be defined as the state of a gum in an aqueous composition wherein the concentration of salt is above the critical concentration.

As a consequence of the concentration of salt being above the critical concentration, the salt-sensitive gum may not be molecularly dissolved. Preferably, "salted-out" can be defined as that the salt-sensitive gum is in a not-molecularly dissolved state in the semi-solid food concentrate. Not-molecularly dissolved is a state known to the person skilled in the art. A molecular solution is a homogenous mixture of the dissolved solute and the solvent. In contrast, salted-out gums may form large aggregates or particles that coagulate and flocculate or sediment in a concentrated salt solution above the critical concentration (if no salt tolerant structuring material is present to keep them suspended). Salted out gums that are added as dry powders may not dissolve but stay particulates, sedimenting or flocculating when dispersed in water, i.e. when salt is above the critical concentration. When present in a solution with a salt-level below the critical concentration, the salted-out gums enter into solution.

"Salt-sensitive gum" should preferably be interpreted here as a gum which is able to provide texture enhancing behaviour in water of 20° C., at a pH of from 4.5 to 5.5, when present in an amount of 1 wt % (based on the weight of the total product), and when needed in the presence of a low concentration of appropriate counter ions, whereby the texture enhancing behaviour decreases or is lost above the critical concentration of salt.

The critical concentration of salt which results in the salting out of a salt-sensitive gum, depends on the type of salt in the semi-solid food concentrate. The salt responsible for the salting out of salt-sensitive gum is preferably selected from the group consisting of NaCl, KCl, $CaCl_2$, $MgCl_2$, and mixtures thereof. Alternatively other sources of Calcium (Ca), Sodium (Na), Magnesium (Mg) and Potassium (K) can be used (e.g. $CaCO3$ instead of $CaCl2$).

The salt critical concentrations for NaCl are higher than 8 wt %, preferably 9 wt %. The salt critical concentrations for $CaCl_2$ and $MgCl_2$ are higher then 1 wt %, more preferably higher than 3 wt %. The salt critical concentrations for KCl are higher then 3 wt %, more preferably higher than 5 wt %. These are critical concentrations at a temperature of 20° C. and at a pH of from 4.5 to 5.5 and are based on the weight of the total composition.

The critical concentration of salt can be expressed as wt % of cations from the salting out salt (e.g. $Na^+$)). The critical concentrations of $Na^+$ ions (at 20° C., at a pH of from 4.5 to 5-5) are preferably higher than 3.1 wt %, more preferably higher than 5.9 wt %. The critical concentrations of $Ca^{++}$ (at 20° C., pH 4.5-5.5) are preferably higher then 0.4 wt %, more preferably higher than 1.1 wt %. The critical concentrations of $Mg^{++}$ (at 20° C., pH 4.5-5.5) is preferably higher then 0.25 wt %, more preferably higher than 0.7 wt %. The critical concentrations of $K^+$ (at 20° C., pH of from 4.5 to 5.5) are preferably higher then 1.6 wt %, more preferably higher than 2.6 wt %.

Preferably, the salt-sensitive gum is selected from the group of gums consisting of alginate, gellan, iota-carrageenan, kappa-carrageenan, lambda-carrageenan, and mixtures thereof. More preferably, the salt-sensitive gum is selected from the group of gums consisting of alginate, gellan, iota-carrageenan, kappa-carrageenan and mixtures thereof. More preferably, the salt-sensitive gum is selected from the group consisting of alginate, gellan, iota carrageenan and mixtures thereof. Even more preferably, the salt-sensitive gum is selected from the group of gums consisting of alginate, gellan and mixtures thereof. Alginate and gellan showed optimal capacity to provide a viscous ready to eat end product like a soup, a sauce or a gravy. Gellan gum may be in its original form (high acyl gellan) or may be in a deacetylated form (for example low acyl gellan). Preferably, the gellan is high-acyl gellan. High acyl gellan may be preferred for hot applications, such as for example soups, sauces or gravies. Low acyl gellan may be preferred for applications which are preferably consumed at a temperature of between 10° C. and 60° C., such as for example cold soups or sauces. Alginate can preferably be high guluronate, high mannuronate alginate or propylene glycol alginate. High mannuronate alginate may be preferred for hot applications, such as for example soups, sauces or gravies.

Most preferably, the salt-sensitive gum comprises alginate and gellan. Upon dilution of the semi-solid food concentrate the combination of these gums resulted in a texture of the ready-to eat end product which optimally resembled the texture of a home-made sauce or gravy.

Preferably, the invention relates to a semi-solid food concentrate wherein the salt-sensitive gum or mixtures thereof are present in an amount higher than 0.1 wt %, more preferably higher than 0.2 wt %, even more preferably higher than 0.25 wt %, preferably higher than 0.3 wt %, more preferably higher than 0.4 wt %, more preferably higher than 0.5 wt %, more preferably higher than 1 wt %, most preferably higher than 2 wt %, based on the weight of the semi-solid food concentrate. Preferably the amount is lower than 35 wt %, more preferably lower than 20 wt %, even more preferably lower than 15 wt %, more preferably lower than 10 wt %, more preferably lower than 9 wt %, most preferably lower than 8 wt % based on the weight of the semi-solid food concentrate. The amount of salt-sensitive gums can be adjusted depending on the chosen dilution rate of the semi-solid food concentrate and the degree of viscosity that is desired after dilution of the semi-solid food concentrate.

Preferably the salt-sensitive gum comprises alginate, preferably high mannuronate alginate. Alginate is preferably present in an amounts as given above.

Preferably the salt-sensitive gum comprises gellan, preferably high acyl gellan. In addition to the amounts given above gellan may be present in an amount of lower than 4 wt %, more preferably lower than 2.5 wt %, more preferably lower than 2 wt %, even more preferably lower than 1.5 wt %, based on the weight of the total semi-solid food concentrate.

It may be preferred in other cases, that the salt-sensitive gum is one of the group of gums consisting of, iota-carrageenan, kappa-carrageenan, lambda-carrageenan and mixtures thereof. For some applications, iota-carrageenan may be preferred. These salt-sensitive gums may be preferred in case a more viscous or even semi-solid ready-to-eat end product is desired after dilution.

After dilution of the semi-solid food concentrate in an aqueous liquid, a ready-to-eat end product is provided. A ready-to-eat end product is ready to be consumed, without a further dilution step. The total amount of salt-sensitive gum in the ready-to-eat end product is preferably of from 0.01 to 3.5 wt %, more preferably of from 0.04 to 3 wt %, 0.1 to 2.0 wt %, even more preferably of from 0.2 to 1.5 wt %, most preferably of from 0.3 to 1.3 wt %, It was unexpectedly observed that when plant fibre (citric fibre) was used as a salt-stable structuring material, the fibre remained dispersed after dilution to a ready to eat end product. In the absence of salt-sensitive gums, the fibers may form a layer on top of the ready to eat end product.

Salt

As described, the semi-solid food concentrate of the present invention comprises a salt-sensitive gum. To allow the salt-sensitive gum to be present in the non-dissolved, salted-out state, a relatively high amount of salt is present in the semi-solid food concentrate. Preferably the salt is selected from the group consisting of NaCl, $MgCl_2$, $CaCl_2$, KCl, $NH_4Cl$ and mixtures thereof. Salt may be present in an amount of from 1 wt % to 25 wt %, preferably in an amount of from 2 wt % to 25 wt %, more preferably from 3 wt % to 20 wt %, even more preferably of from 5 wt % to 18 wt %, most preferably of from 5 wt % to 15 wt %, based on the weight of the semi-solid food concentrate.

Preferably at least 50 wt %, more preferably at least 80 wt % of the salt comprises NaCl, even more preferably the salt comprises more than 90 wt % of NaCl. Salt is preferably NaCl. Preferably, the semi-solid food concentrate comprises NaCl in an amount of from 8 wt % to 25 wt %, based on the weight of the semi-solid food concentrate. More preferably, NaCl is present in an amount of from 9 wt % to 20 wt %, even more preferably in an amount of from 9 wt % to 18 wt %, based on the weight of the semi-solid food concentrate.

Instead of NaCl, but preferably in addition to NaCl, the semi-solid food concentrate may comprise a salt selected from the group consisting of $MgCl_2$, $CaCl_2$, KCl, $NH_4Cl$ and mixtures thereof.

Preferably, the salt comprises $CaCl_2$ in an amount of from 1 wt % to 40 wt %, more preferably of from 3 wt % to 25 wt %, more preferably from 3 wt % to 15 wt %, based on the weight of the semi-solid food concentrate. The amount may be for example of from 1 to 3 wt %, based on the weight of the gelled food concentrate.

Preferably, the salt comprises $MgCl_2$ in an amount of from 1 wt % to 25 wt %, more preferably of from 3 wt % to 15 wt %, more preferably from 3 wt % to 10 wt %, based on the weight of the semi-solid food concentrate. The amount may be for example of from 1 to 3 wt %, based on the weight of the gelled food concentrate.

Preferably, the salt comprises KCl in an amount of from 3 wt % to 35 wt %, more preferably of from 5 wt % to 20 wt %, more preferably from 5 wt % to 15 wt %, based on the weight of the semi-solid food concentrate. The amount may be for example of from 1 to 3 wt %, or from 3 to 5 wt %, based on the weight of the gelled food concentrate. When the salt-sensitive gum comprises carrageenan, it may be preferred that the salt comprises $CaCl_2$ or $MgCl_2$, preferably in addition to NaCl. In a composition of the invention, kappa carrageenan is preferably combined with KCl, $MgCl_2$ or mixtures thereof, preferably in combination with NaCl. Iota-carrageenan is preferably combined with $CaCl_2$, $MgCl_2$ or mixtures thereof, preferably in combination with NaCl. Alginate is preferably combined with $CaCl_2$, $MgCl_2$ or mixtures thereof, preferably in combination with NaCl. Gellan is preferably combined with KCl, preferably in combination with NaCl.

The salt is preferably present in a dissolved form. When the salt is not dissolved, which may occur for example when the semi-solid food concentrate is over-saturated for salt or (locally) dried out, this may give a negative, for example a non-fresh, appearance for the consumer.

Water

The semi-solid food concentrate of the invention comprises water. Preferably the amount of water is from 20 wt % to 91.5 wt % (based on the weight of the total semi-solid food concentrate). More preferably, the amount of water is from 30 wt % to 70 wt %, even more preferably from 40 wt % to 65 wt %.

Preferably, the water activity of the total semi-solid food concentrate is between 0.7 and 0.95, preferably of from 0.73 to 0.85.

Other Ingredients

The semi-solid food concentrate of the invention preferably is a concentrate to prepare a ready to eat end product preferably a savory food product like a soup, sauce or gravy. The savory food product is preferably a viscous soup, a viscous sauce or a viscous gravy. It preferably contains ingredients that contribute to the savory character of these types of food product. Preferably the semi-solid food concentrate comprises taste-imparting ingredients from the group consisting of yeast extract, beef extract, chicken extract, hydrolysed vegetable, vegetable powders, particulates of herbs, particulates of vegetable, particulates of meat and mixtures thereof. Taste imparting ingredients are preferably present in an amount of from 0.1 to 30 wt %, more preferably of from 2 wt % to 25 wt %, or from 5 wt % to 30 wt %, most preferably of from 5 wt % to 20 wt %, based on the weight of the semi-solid food concentrate.

In the ready-to-eat end product, resulting after dilution of the semi-solid food concentrate, the amount of taste imparting ingredient is preferably of from 0.1 wt % to 5 wt %, more preferably of from 0.5 wt % to 4 wt %, most preferably of from 1 wt % to 3.5 wt %, based on the weight of the ready-to-eat end product.

It can be preferred that the ready-to-eat end product is free from particles. "Particles" in the context of "other ingredients", does not refer to salt-sensitive gum particles. A particle should be construed here as a particle that is visible with the naked eye in the ready-to-eat end product, i.e. after dilution of the semi-solid food concentrate in an aqueous liquid, such as water. For some applications, for example for a concentrate for a viscous soup, it might be preferred that some particles are present. If particles are present, particles may be present in an amount of from 0.5 wt % to 10 w %, more preferably of from 1 wt % to 8 wt %, even more preferably of from 2 wt % to 5 wt %, based on the weight of the semi-solid food concentrate.

To contribute further to the savory character of the food product, the semi-solid food concentrate may comprise some monosodium glutamate. However, the amount is preferably relatively low, or more preferably, the semi-solid food concentrate is substantially free from monosodium glutamate.

Monosodium glutamate is preferably present in an amount of lower than 40 wt %, preferably lower than 20 wt %, even more preferably lower than 10 wt %, even more preferably lower than 5 wt %, most preferably lower than 1 wt %, by weight of the semi-solid food concentrate. The amount of monosodium glutamate may for example be of from 1 wt % to 40 wt %, from 5 wt % to 20 wt %, from 5 wt % to 10 wt % or from 1 wt % to 10 wt % by weight of the semi-solid food concentrate.

It might be preferred that the semi-solid food concentrate of the present invention comprises a relatively low amount of non-gelatinised starch. Higher amounts of starch result in complications like high viscosity during production of the semi-solid food concentrate, less formulation flexibility, an opaque appearance of the product and/or a starchy taste in the ready-to-eat end product. Therefore, preferably, the semi-solid food concentrate comprises less than 30 wt % of non-gelatinised starch, preferably less than 25 wt %, more preferably less than 20 wt %, even more preferably less than 15 wt %, even more preferably less than 10 wt %, even more preferably less than 5 wt %, even more preferably substantially free of non-gelatinised starch, most preferably, 0% of non-gelatinised starch, based on the weight of the semi-solid food concentrate. The amount may be for example of from 5 wt % to 30 wt %, preferably of from 10 wt % to 30% or can be of from 10 to 25 wt %, based on the weight of the gelled food concentrate.

Fat

If the semi-solid food concentrate is a gel, it may be preferred that the semi-solid food concentrate of the present invention may contain fat and is preferably a water-continuous composition. The term "fat" is defined for the present purpose as any edible triglyceride or mixtures of triglycerides. The term is meant to include triglycerides which are liquid (oil) at 20 degrees C. The amount of fat is preferably relatively low in case of a gelled food concentrate. Fat might negatively affect the structure of the semi-solid food concentrate. Preferably, the amount of fat is lower than 30 wt %, more preferably lower than 15 wt %, even more preferably lower than 10 wt %, even more preferably lower than 5 wt %. Some fat might however be desired for some applications. It might be preferred that the amount of fat is from 0 wt % to 15 wt %, or from 0.5 wt % to 10 wt %, or from 3 wt % to 8 wt %, based on the weight of the total semi-solid food concentrate. These amounts may also be present in case the semi-solid food concentrate is not in the form of a gel, but for example in the form of a paste.

An advantage of the present invention is that semi-solid food concentrates can be provided according to the present invention which allow pasteurisation or sterilisation, without dramatically reducing the thickening capacity in the ready-to-eat end product. The semi-solid food concentrate may however comprise some preservatives. It is in the skill of an artisan to choose a suitable preservative. However the semi-solid food concentrate is preferably free from alcohol, such as for example ethanol, as this not preferred from a consumer perspective in a savory food composition. The use of sugar alcohols in the semi-solid food composition, e.g. or use as a humectant, is less desired. These might have a negative consumer appearance. An example of a sugar alcohol is sorbitol. The amount of sugar alcohol, for example of sorbitol, is preferably lower than 3 wt %, preferably lower than 1 wt %, preferably the semi-solid food concentrate is substantially free from sugar alcohols.

Salt-Stable Structuring Material.

The semi-solid food concentrate of the present invention preferably comprises a salt-stable structuring material in an amount effective to provide a semi-solid food concentrate. A salt-stable structuring material is a structuring material which is able to form a shape stable texture in water at a salt content of higher than the amount critical to keep the salt-sensitive gum in the semi-solid food concentrate in the salted-out state. The amount of salt-stable structuring material depends on the desired texture, e.g. the hardness of the semi-solid food concentrate. It may further depend on the type of salt-stable structuring material that is used, as some salt-stable structuring materials require a higher concentration than other salt-stable structuring material, as is known in the art. It may further depend on the salt content and the type of salt. Preferably, the salt-stable structuring material is a structuring material which forms a shape stable gel (not liquid, preferably elastic) in water at a salt content of higher than the amount that is critical to keep the salt-sensitive gum to be used in the semi-solid food concentrate in the salted-out state. Preferably, the salt is selected from the group consisting of NaCl, $MgCl_2$, $CaCl_2$, KCl, $NH_4Cl$ and mixtures thereof.

A skilled person can easily find out how much salt-stable structuring material is necessary and which type is suitable for a specific semi-solid food concentrate. Preferably, the salt-stable structuring material is a structuring material which provides a shape-stable gel (not liquid, preferably elastic), at 20° C. in water with a dissolved NaCl content of from 8 wt % or preferably higher based on the weight of the total semi-solid food concentrate.

It may also be preferred that the salt-stable structuring material is a structuring material which provides a shape-stable texture (not liquid, preferably elastic), at 20° C. in water with a dissolved $MgCl_2$ or $CaCl_2$ content of 3 wt % or preferably higher based on the weight of the total semi-solid food concentrate.

It may also be preferred that the salt-stable structuring material is a structuring material which provides a shape-stable texture (not liquid, preferably elastic), at 20° C. in water with a dissolved KCl content of 5 wt % or preferably higher based on the weight of the total semi-solid food concentrate.

Preferably, the amount of salt-stable structuring material is from 0.1 to 30 wt %, more preferably of from 0.2 to 20 wt %, even more preferably of from 0.5 to 10 wt %, even more preferably of from 0.8 to 7 wt %, most preferably 0.8 to 3 wt % based on the water content of the semi-solid food concentrate. The amount based on the water content is calculated as (amount of salt-stable structuring material)/(amount of salt-stable structuring material+amount of water)×100%.

The salt-stable structuring material can preferably be selected from the group consisting of salt stable gelling system, gums (for example galactomannan), vegetable powder (for example onion powder), plant puree, plant fibre (for example citrus fibre), fat and mixtures thereof. The salt-stable structuring material is preferably a salt stable gelling system, This may be preferred for example for a semi-solid food concentrate in the form of a gel. A salt-stable gelling system is a gelling system which is able to form a shape stable gel in water at a salt content of higher than the amount critical to keep the salt-sensitive gum in the gelled food concentrate in the salted-out state. Although it is preferred to use the salt stable gelling system to form a gel, a salt stable gelling system can also be used to make a semi-solid food product which is not a gel, such as for example a paste.

Preferably, the salt-stable gelling system comprises, more preferably is a salt-stable gelling system selected from the group consisting of (gelatinised) modified starch, gelatine combined with (gelatinised) starch, xanthan gum combined with a glucomannan, xanthan gum combined with a galactomannan, and mixtures thereof. These gelling systems are gelling systems which are salt-stable at relatively high concentrations of NaCl, and can provide a shape stable gel.

Preferably, the salt-stable gelling system comprises more than 50 wt %, preferably more than 75 wt %, more preferably more than 90 wt %, most preferably more than 95 wt % (based on the weight of the salt-stable gelling system) of one of the group of gelling systems consisting of modified starch, gelatine combined with starch, xanthan gum combined with a glucomannan, xanthan gum combined with a galactomannan. Most preferably, the salt-stable gelling system comprises more than 50 wt %, preferably more than 75 wt %, more preferably more than 90 wt %, most preferably more than 95 wt % (based on the weight of the salt-stable gelling system) of a gelling system consisting of xanthan gum combined with a galactomannan.

In some cases, it may be preferred that the salt-stable gelling system comprises, more preferably, is modified starch, preferably acid-modified starch. When it is desired that modified starch is present, it is present in an activated form, i.e. in the gelatinised form. Modified starch is preferably present in an amount of from 10 wt % to 30 wt % (weight % based on water content of the semi-solid food concentrate).

It may be preferred that the salt-stable gelling system comprises, more preferably, is xanthan gum combined with a glucomannan. Konjac mannan is a glucomannan. The amount of xanthan gum then is preferably present in an amount of from 0.1 wt % to 2 wt %, preferably in an amount of from 0.4 wt % to 1.8 wt %, even more preferably of from 0.6 wt % to 1.5 wt %, most preferably of from 0.6 wt % to 1 wt % (weight % based on the water content of the semi-solid food concentrate). The glucomannan is preferably present in an amount of from 0.5 wt % to 4 wt %, more preferably of from 0.6 wt % to 2 wt %%, even more preferably of from 0.6 wt % to 1.5%, most preferably of from 0.6 wt % to 1 wt % (weight % based on water content of the concentrate). The glucomannan is present in combination of xanthan gum, forming a salt-stable gelling system. The ratio of xanthan gum to glucomannan and of xanthan gum to konjac mannan is preferably of between 95:5 to 5:95, more preferably of from 90:10 to 10:90, even more preferably of from 80:20 to 20:80. Konjac mannan alone, i.e. in the absence of xanthan gum, often does not provide an optimal texture for most of the applications in the context of the present invention, and is therefore not preferred as a salt-stable gelling system. As the gelling behaviour of konjac mannan is relatively slow, the salted-out gum may sediment before a gel is formed, which is not desired. It may be preferred that the semi-solid food concentrate contains less than 0.5 wt %, preferably is substantially free from konjac mannan.

It may be preferred that the salt-stable gelling system comprises, more preferably, is a combination of gelatine and (gelatinised) starch. In this case, gelatine is preferably present in an amount of from 1.5 wt % to 30 wt %, more preferably in an amount of from 6 wt % to 20 wt %, even more preferably of from 12 wt % to 20 wt %, based on the water content of the semi-solid food concentrate. The starch is preferably present in an amount of from 0.1 wt % to 10 wt %, more preferably from 1 wt % to 7 wt %, most preferably of from 3 wt % to 6 wt %, based on the water content of the semi-solid food concentrate. Starch is present in the activated, i.e. gelatinised form.

It may be preferred that the salt-stable gelling system comprises, more preferably, is xanthan gum combined with a galactomannan. Preferably, the combination of xanthan gum with galactomannan is present in an amount of from 0.1 wt % to 10 wt %, preferably in an amount of from 0.2 wt % to 7 wt %, more preferably in an amount of from 0.5 wt % to 5 wt %, most preferably in an amount of from 0.8 wt % to 3 wt %, based on the weight of the water content of the semi-solid food concentrate. The galactomannan alone, i.e. in the absence of xanthan gum, did not provide an optimal texture in the context of the present invention, or did not show a shape stable gel, and is therefore not preferred as salt-stable gelling system.

Optimal results were observed when the galactomannan is selected from one of the group consisting of locust bean gum, guar gum, cassia gum, tara gum and mixtures thereof. More preferably, the galactomannan is selected from the group consisting of locust bean gum and guar gum and mixtures thereof, most preferably, the galactomannan is locust bean gum. Therefore, the salt-stable gelling system preferably comprises xanthan gum combined with anyone of the group consisting of locust bean gum, guar gum and mixtures thereof. Most preferably, the salt-stable gelling system is the combination of xanthan gum and locust bean gum. This combination of xanthan gum with galactomannan, preferably with locust bean gum, is preferably present in an amount of from 0.1 wt % to 10 wt %, preferably in an amount of from 0.2 wt % to 7 wt %, more preferably in an amount of from 0.5 wt % to 5 wt %, most preferably in an amount of from 0.8 wt % to 3 wt, based on the weight of the water content of the semi-solid food concentrate.

The ratio of xanthan gum to galactomannan is preferably of between 95:5 to 5:95, more preferably of from 90:10 to 10:90, even more preferably of from 80:20 to 20:80, even more preferably 70:30 to 30:70. It may be preferred in some cases that the amount of xanthan gum is higher than the amount galactomannan. Preferably, the ratio xanthan gum to galactomannan may be from 50:50 to 90:10, more preferably of from 60:40 to 80:20. Based on the weight of xanthan gum and galactomannan taken together.

Preferably, any of the preferred groups of salt-stable gelling systems, more preferably, any of the indicated salt-stable gelling system is present in an amount of more than 50 wt %, preferably more than 75 wt %, more preferably more than 90 wt %, most preferably more than 95 wt % based on the total amount of salt stable gelling system, present in the semi-solid food concentrate.

Preferably, the total amount of gums in the semi-solid food concentrate is higher than 2 wt %, more preferably higher than 3 wt %, even more preferably higher than 4 wt %, even more preferably higher than 5 wt %, even more preferably higher than 8 wt %, most preferably higher then 10 wt %, based on the water content of the semi-solid food concentrate. Gums include here both salt sensitive and salt stable gums.

The total amount of gums in the semi-solid food concentrate is preferably lower than 40 wt %, more preferably lower than 35 wt %, even more preferably lower than 30 wt %, even more preferably lower then 25 wt %, based on the water content based on the water content of the semi-solid food concentrate. "Based on water content" should be calculated as (amount of gums)/(amount of gums+amount of water)×100%. Preferred ranges may be of from 4 wt % to 35 wt %, from 5 wt % to 35 wt %, from 8 wt % to 30 wt %, or from 10 wt % to 25 wt % based on the water content of the semi-solid food concentrate.

Although starch is preferably not present in the semi-solid food concentrate, if it is present, then the preferred amounts of gums and starch taken together as recited for the amounts of gums in the previous two paragraphs.

Weight

The weight of the semi-solid food concentrate according to the present invention is preferably more than 2 g, preferably more than 10 g, even more preferably more than 15 g, most preferably higher than 20 g and preferably less than 10 kg, more preferably less than 1 kg, even more preferably less than 500 g, even more preferably less than 300 g, even more preferably less than 100 g, most preferably less than 50 g. Semi-solid food concentrates with a size of from 2 g to 300 g, preferably of from 10 g to 100 g, most preferably of from 15 g to 50 g are in particular suitable for, but not limited to, unit dosing and are preferably designed for single use (e.g. for dilution in 250 ml). The relatively small formats showed optimal dilution behavior.

The semi-solid food concentrates can also be a multi-dosing format, although the format is not limited to this. In this case the consumer can dilute only part of the semi-solid food concentrate of the invention in an appropriate amount of liquid, by for example using a spoon or other suitable utensil. In case of a multi-dose format, the weight of the concentrate can preferably be from 80 g to 1 kg, more preferably from 100 g to 850 g.

Process

In a further aspect, the present invention relates to process to prepare a semi-solid food concentrate according to the invention. In step a) of the process of the invention preferably a mixture is provided comprising at least part, preferably all of the water and the salt-stable structuring material. In a preferred situation, in addition to water and salt-stable structuring material, salt and salt-sensitive gum are also mixed in step a).

Consecutively, the salt-stable structuring material in the mixture of step a) may be activated. This may be preferred when the salt-stable structuring material is a gelling system. Activation preferably comprises heating, preferably heating the mixture at a temperature above the activation temperature of the salt-stable structuring material. Preferably the heating step is carried out at a temperature of from 50° C. to 100° C., more preferably of from 55° C. to 95° C., most preferably of from 60° C. to 90° C. Optionally, any other remaining ingredients may be added to the mixture after possible activation, before packaging. For example, if salt and salt-sensitive gum were not added in step a), these may be added before packaging.

In step b), the mixture resulting from step a) is packaged. Especially for unit-dosing applications, packaging is preferably done in a tub or a cup, which is preferably sealed after packaging. For multi-dosage products, packaging may be done in a jar. Before the product is filled into the packaging, it may be cooled, preferably to a temperature of slightly above the gelation temperature of the salt-stable gelling agent.

The mixture is usually solidified. Solidifying preferably comprises cooling. Cooling is preferably carried out by cooling the product using a cooling device or allowing the product to cool. By solidifying the salt-stable structuring material, it forms a structuring network. Although solidification is preferably carried out after step b), it might be preferred in some cases that solidification is carried out before step b). This might be the case, for example, if the mixture resulting from step a) is cast in a mould, and solidified. After setting to a gel, the product is packaged.

The product of the invention can also be produced by adding a salted-out gum to a mixture comprising water, salt and salt stable gelling agent. Therefore, the invention further relates to a process wherein the salt-sensitive gum is added to the mixture of step a) in a salted-out state.

The salt-sensitive gum in salted-out state may be prepared by providing a pre-mixture comprising water, salt-sensitive gum and salt in a concentration to bring the salt-sensitive gum in the salted-out state. The salted out gum is preferably precipitated. Preferably, the salt is NaCl, preferably present in an amount of higher than 8 wt % based on the weight of the pre-mixture. When precipitated, salt-sensitive gum in the salted-out state can be separated from the pre-mixture, for example by filtration or centrifugation. This could be advantageous, for example in case the salt-sensitive gum is alginate or gellan.

In a further aspect, the invention relates to a process to prepare a ready-to-eat end product, comprising the step of diluting at least part of a semi-solid food concentrate according to the invention in an aqueous liquid. The aqueous liquid is preferably water. Preferably, the temperature of the aqueous liquid is of between 5° C. and the boiling temperature of the aqueous liquid, preferably of from 20° C. to 100° C., more preferably of from 40° C. to 100° C., even more preferably of from 55° C. to 100° C., most preferably of from 70° C. to 100° C.

Viscosity of the Ready-to-Eat End Product

Preferably, the semi-solid food concentrate, after dilution in an aqueous liquid, preferably water, can result in a ready-to-eat end product having a viscosity of higher than 15 mPa·s, more preferably, higher than 20 mPa·s, even more preferably higher than 40 mPa·s, even more preferably higher than 50 mPa·s, most preferably higher than 60 mPa·s. The viscosity can preferably be lower than 10000 mPa·s, preferably lower than 5000 mPa·s, more preferably lower than 2000 mPa·s, more preferably lower than 1500 mPa·s, even more preferably lower than 1000 mPa·s, and most preferably lower than 300 mPa·s. In the case the concentrate is used for sauces or gravies, the viscosity can be preferably between 20 and 350 mPa·s, more preferably between 40 and 250 mPa·s, more preferably between 40 and 350 mPa·s, even more preferably between 50 and 200 mPa·s, and most preferably between 50 and 150 mPa·s.

Preferably, the indicated viscosities are present at 20° C. More preferably, the indicated viscosities are present at 50° C., even more preferably, at 70° C. Most preferably the ready-to-eat end product shows the indicated preferred viscosity at 20° C. and also at 50° C., preferably also at 70° C., more preferably at both 50° C. and 70° C. Viscosity can preferably be measured as follows: Samples are diluted (for example, 1 g to 4 g in 25 ml of water, depending on the portion size and ingredient concentrations) at a temperature of 99° C., while stirring. The solutions are transferred into a rheometer (for example, MCR300Physica, Anton Paar) pre-heated at 85° C. and equipped with a profiled cylinder and bob. The shear rate is set to 30/s throughout the experiment. The temperature is kept at 75° C. for 2 minutes, the solution is cooled to 20° C. at 2° C./min and kept for 2 minutes at 20° C. Then the viscosities are read at for example 70° C., 50° C. and 20° C. and are expressed in mPa·s.

Dilution

Preferably, the invention relates to a process to prepare a ready-to-eat end product, comprising the steps of diluting at least part of a semi-solid food concentrate according to the invention in an aqueous liquid, like water, preferably hot water, at for example 99° C. In the process of mixing the semi-solid food concentrate with e.g. hot water, some components may dissolve rather than dilute. The term "dilution" as used in the present application is meant to cover both dilution and dissolution. Preferably, the dilution factor of the semi-solid food concentrate to aqueous liquid is of between 4 to 100 times, more preferably of between 5 and 50 times, even more preferably of between 8 and 20 times based on the weight of the semi-solid food concentrate. For example, a dilution of 10 times should be interpreted as diluting 10 g semi-solid food concentrate in 90 g of water.

Preferably, the invention relates to a process to prepare a ready-to-eat end product, comprising the step of diluting at least part of a semi-solid food concentrate according to the invention in an aqueous liquid, preferably using a diluting rate of between 4 and 100 times.

Dilution is preferably relatively fast. Preferably a semi-solid food concentrate according to the present invention with a size of 18 g dilutes in 250 ml of water at 99° C., using stirring, e.g. by using wire whisk, in a time period of less than 4 minutes, more preferably less than 3 minutes. As the semi-solid food concentrate of the present invention is a concentrated product, it preferably allows dilution as described below.

After dilution of the semi-solid food concentrate of the present invention, the salt content of the ready-to-eat end product is preferably of from 0.2 to 2.5 wt %, more preferably of from 0.5 wt % to 1.7 wt %, even more preferably of from 0.7 wt % to 1.5 wt %, most preferably of from 0.8 to 1.4 wt %, based on the weight of the ready-to-eat end product. This complies with an amount of from 2 to 17 g/liter, 5 to 17 g/liter, 7 to 15 g/liter, 8 to 14 g/liter, respectively.

The invention further relates to the use of a semi-solid food concentrate of the present invention to provide a gravy, a soup, or a sauce, preferably to provide a gravy.

Different embodiments of the invention may be carried out in using preferred or more preferred conditions (e.g. pH) or ingredients (e.g. levels of salt-sensitive gum, salt). Preferred ranges will often be described in the following format: preferably at least x1, more preferably at least x2, even more preferably x3, preferably at most y1, more preferably at most y2, even more preferably at most y3, whereby x1<x2<x3<y3<y2<y1. This format is meant to include the preferred ranges x1 to y1, more preferably x2 to y2 and even more preferably x3 to y3 whereby the endpoints are included and also all sub ranges subsumed therein (e.g. x1 to y3 and x3 to y1). The same applies when ranges are described in the format "higher/more than x1" or "lower/less than y1" except that the endpoints are not included.

Vice versa, when preferred ranges are described as x1 to y1, more preferably x2 to y2 and even more preferably x3 to y3, the endpoints are meant to be included and also all subranges subsumed therein (e.g. x1 to y3 and x3 to y1). In addition, all open ended ranges are meant to be included: preferably at least x1, more preferably at least x2, even more preferably x3, preferably at most y1, more preferably at most y2, even more preferably at most y3.

The term "comprising" whenever used in this document is intended to indicate the presence of stated features, integers, steps, components, but not to preclude the presence or addition of one or more other features, integers, steps, components or groups thereof.

Ingredients such a salt-sensitive gum, salt etc will be used in singular, although it should be noted that even when used in singular it is not meant to exclude a mixture of e.g. salt-sensitive gums and salts respectively.

The invention will now be illustrated by the following non-limiting examples.

EXAMPLES

Example 1

Semi-Solid Gravy Concentrates in the Form of a Gel

Semi-solid food concentrates were prepared (Examples 1B-1D) and the gel strength and viscosity after dilution, were compared to a semi-solid food concentrate without salt-sensitive gum (comparative example 1A).

TABLE 1

|  |  | Comp. Ex. 1A | Ex. 1B | Ex. 1C | Ex. 1D |
|---|---|---|---|---|---|
| High acyl gellan (salt-sensitive gum) |  | 0 | 2.0 | 0 | 0 |
| Low acyl gellan (salt-sensitive gum) |  | 0 | 0 | 2.0 | 0 |
| Alginate (salt-sensitive gum) |  | 0 | 0 | 0 | 4.0 |
| Water |  | 56.5 | 54.8 | 54.8 | 52.8 |
| NaCl |  | 19.7 | 19.2 | 19.2 | 19.2 |
| Salt-stable structuring material (gelling system) | Xanthan gum | 0.5 | 0.5 | 0.5 | 0.5 |
|  | Locust bean gum | 0.2 | 0.2 | 0.2 | 0.2 |
| Beef Fat |  | 4.5 | 4.6 | 4.6 | 4.6 |
| Taste imparting ingredients (incl. 4.7 wt % of salt) |  | 18.6 | 18.7 | 18.7 | 18.7 |
| Total wt % |  | 100 | 100 | 100 | 100 |
| Concentrated |  |  |  |  |  |
| G' at 20° C., relative to Comp. Ex. 1A |  | 1 | 1.9 | 1 | 2.3 |
| G'/G" |  | >3 | >3 | >3 | >3 |
| After 10× dilution |  |  |  |  |  |
| salt-sensitive gum after dilution |  | 0 | 0.2% | 0.2% | 0.4% |
| Viscosity at 70° C. (mPa·s) |  | 2 | 244 | 5 | 16 |
| Viscosity at 50° C. (mPa·s) |  | 4 | 296 | 54 | 30 |
| Viscosity at 20° C. (mPa·s) |  | 10 | 431 | 134 | 51 |

The gravy concentrates in the form of a gel according to the recipes in Table 1 were prepared in the following way. Approximately 500 g of the recipes 1A to 1D was prepared.

Water and salt (NaCl) were weighed in a glass jar and stirred with an overhead stirrer (IKA RW 16 basic) until salt was completely dissolved. Subsequently, salt-sensitive biopolymer (when present), the salt-stable gelling system, taste imparting ingredients (flavours and seasonings) were added to the salt solution and stirred at room temperature for at least 15 min using the overhead stirrer. For Examples 1B-1D High acyl gellan (Kelcogel LT 100, CP Kelco), Low acyl gellan (Kelcogel, CP Kelco) and Alginate (Grindsted Alginate FDI 175, Danisco) were used, respectively. The mixture was then transferred to a controlled temperature water bath at ~87° C. The solid fat was then added and the final mixture was heated up to 85° C. and kept at this temperature for at least 3 min. The mixture was then cooled quiescently and analysed.

The elastic modulus (G') here defined was measured in a state of the art rheometer (TA AR G2 or TA2000 ex, TA instruments). The test was performed after at least 12 h maturation time under ambient conditions. The test set up was: parallel plate geometry, 1000 μm gap, oscillatory frequency of 1 Hz and 0.5% strain.

The test procedure was: the samples were a) loaded in the rheometer at 90° C., b) submitted to a temperature sweep (cooling from 90-20° C. at 5° C./min at 0.5% strain and 1 Hz frequency and c) kept at 20° C. for at least 10 min (0.5% strain and 1 Hz frequency). G' and G" were taken as the value after 10 min at 20° C.

Semi-solid gravy concentrates comprising the salt-sensitive gum according to the invention (1B to 1D) showed gel strength (G' in Pa) in the same order of magnitude of that of the control sample (1A).

Upon dilution in hot water, a viscous ready-to-eat end product was obtained. The viscosity of the resulting ready-to-eat end product was compared to the viscosity of water comprising a diluted semi-solid food concentrate without salt-sensitive gum. The viscosities of the ready to eat end products were measured with the following method: Samples (2 to 3 g) where diluted in 18 to 27 ml (e.g. 2 g of jelly in 18 ml of water to provide 10 times dilution) of water at a temperature of 99° C. within 3 minutes, while stirring (160 to 960 rpm). The samples were measured at 10 times dilution.

The solutions were transferred into a MCR300 rheometer (Physica, Anton Paar) pre-heated at 85° C. and equipped with a profiled cylinder and bob. The shear rate was set to 30/s throughout the experiment. The temperature was kept at 75° C. for 2 minutes, the solution was cooled to 20° C. at 2° C./min. and kept for 2 minutes at 20° C. Then the viscosities were expressed in mPa·s.

Examples 1B-1D showed a higher viscosity of the ready to eat end product, compared to comparative example 1A.

The observed viscosities in the ready to eat end product differed for the different salted out gums that were tested. A different texture enhancing behaviour allows to adjust a semi-solid food concentrate, depending of the desired gel strength, the amount of thickening (viscosity) after dilution and/or the desired temperature at which the ready to eat end product is used (and the specific viscosity is desired).

Example 2

Semi-Solid Food Concentrates in the Form of a Gel

Semi-solid food concentrates in the form of a gel were prepared (Examples 2B, 2C) and the gel strength and viscosity after dilution were compared to a composition without salt-sensitive gum (comparative example 2A).

TABLE 2

|  | Comp. Ex. 2a | Ex. 2b | Ex. 2c |
|---|---|---|---|
| High acyl Gellan (salt-sensitive gum) | 0 | 2 | 0 |
| Alginate (salt-sensitive gum) | 0 | 0 | 2 |
| Water | 77 | 75 | 75 |
| NaCl | 20 | 20 | 20 |
| Salt-stable structuring material (gelling system)   Xanthan gum | 0.6 | 0.6 | 0.6 |
| Locust bean gum | 0.3 | 0.3 | 0.3 |
| Colorant (Malt extract) | 2 | 2 | 2 |
| Total (wt %) | 100 | 100 | 100 |
| Concentrated | | | |
| G' at 20° C., relative to Comp. Ex. 2A | 1 | 2.8 | 1.5 |
| G'/G" | >3 | >3 | >3 |
| After 10× dilution; e.g. 20 g to be diluted in 180 g | | | |
| salt-sensitive gum after dilution | 0.2% | 0.2% | 0.2% |
| NaCl after dilution | 2% | 2% | 2% |
| After 10× dilution | | | |
| Viscosity at 50° C. (mPa · s) | 5 | 38 | 11 |
| Viscosity at 20° C. (mPa · s) | 14.2 | 121.5 | 22.3 |

The semi-solid concentrates in the form of a gel according to the recipes in Table 2 were prepared in the following way. 200 g of each composition was prepared.

Water and salt (NaCl) were weighed in a glass jar and stirred with magnetic stirrer until salt was completely dissolved. Subsequently, salt-sensitive gum (when present), the salt-stable gelling system, and colorant were added to the salt solution and stirred at room temperature for at least 15 min using the magnetic stirrer.

For Examples 2B and 2C, as salt sensitive biopolymer High acyl gellan (Kelcogel LT100, CP Kelco) and Alginate (Grindsted FD155, Danisco) were used, respectively. The mixture was then transferred to a controlled temperature water bath at 87° C. The final mixture was heated up to 85° C. and kept at this temperature for at least 5 min. The mixture was then cooled quiescently and analysed.

The viscosities in Table 2 were measured with the method described in example 1 elastic moduli (G') and viscous moduli (G"), were also measured using the method described in the example 1.

Semi-solid food concentrates comprising the salt-sensitive gums according to the invention (2B to 2C) showed a gel strength (G' in Pa) which was comparable to the control sample (2A). Compared with comparative Example 2A, Examples 2B and 2C provided a higher viscosity in the ready to eat end product, after dilution.

Example 3

Comparison Salt-Sensitive Gum (this Invention) Vs. "Salt-Stable Biopolymer"

TABLE 3

|  | Comp. Ex. 3A | Ex. 3B | Comp. Ex. 3C |
|---|---|---|---|
| Salt-sensitive gum: HA Gellan | 0 | 1.3 | 0 |
| Salt stable gum: Xanthan gum | 0 | 0 | 3.1 |
| Water | 45.4 | 44.9 | 44.0 |
| NaCl | 13.2 | 13.0 | 12.8 |

TABLE 3-continued

|  |  | Comp. Ex. 3A | Ex. 3B | Comp. Ex. 3C |
|---|---|---|---|---|
| Salt-stable structuring material (gelling system) | Xanthan gum | 0.5 | 0.5 | 0.5 |
|  | Locust bean gum | 0.5 | 0.5 | 0.5 |
| Beef Fat |  | 5 | 4.9 | 4.8 |
| Taste imparting ingredients (flavours and seasonings, incl. ca. 18% salt) |  | 35 | 35 | 34.3 |
| Total | | 100 wt % | 100 wt % | 100 wt % |
| Concentrated | | | | |
| G' at 20° C., relative to Comp. Ex. 3A | | 1 | 1.3 | — |
| G'/G" | | >3 | >3 | — |
| After 10× dilution | | | | |
| Gum after dilution (wt %) | | — | 0.12 | — |
| Viscosity at 70° C. (mPa · s) | | 2 | 84 | — |
| Viscosity at 50° C. (mPa · s) | | 5 | 101 | — |
| Viscosity at 20° C. (mPa · s) | | 9 | 153 | — |

Concentrated gravy jellies in the example 3 had the following specified preparation method. Cold water was weighed in a glass jar of approximately 800 ml. All other ingredients, except beef fat, were weighted and added simultaneously to the water while stirring with an overhead stirrer (IKA RW 16 basic). The amount of texture enhancing biopolymer in Comparative example 3C (with added xanthan) was calculated in order to provide a viscosity range in application comparable to that of Example 3B (this invention) and (average of 100-200 mPa·s between 20-70° C.). Hot viscosity (70° C.) was desired to be >70 mPa·s. The stirring was kept at room temperature for at least 30 min prior heating. The mixture was subsequently transferred to a water bath kept at 87° C. and kept at this temperature for at least 30 min, also ensuring that the mixture was at 85° C. for at least 3 min (pasteurisation step). The mixture was then cooled quiescently and analysed. The viscosities in Table 3 were measured with the method described in Example 1. Elastic moduli (G') and Viscous Moduli (G"), reported at 20° C., were also measured using the method described in the Example 1. Compositions 3A and 3B were shape stable semi-solid food concentrates. Comparative example 3C was not possible to prepare. The viscosity was too high during preparation and therefore not all dry ingredients could be added to the water.

Example 4

Salt-Sensitive Gum in Comparison to Starch

TABLE 4

|  |  | Ex. 4A | Comp. Ex. 4B | Comp. Ex. 4C | Comp. Ex. 4D |
|---|---|---|---|---|---|
| Salt-sensitive gum | Gellan | 0.9 | — | — | — |
|  | Alginate | 6.3 | — | — | — |
| Corn starch |  | — | 34.1 | — | — |
| Potato starch |  | — | — | 34.1 | — |
| Tapioca starch |  | — | — | — | 34.1 |
| Water |  | 52.7 | 35.7 | 35.7 | 35.7 |
| NaCl |  | 12.2 | 9.2 | 9.2 | 9.2 |
| Salt-stable structuring material (gelling system) | Xanthan gum | 0.5 | 0.4 | 0.4 | 0.4 |
|  | Locust bean gum | 0.5 | 0.4 | 0.4 | 0.4 |

TABLE 4-continued

|  | Ex. 4A | Comp. Ex. 4B | Comp. Ex. 4C | Comp. Ex. 4D |
|---|---|---|---|---|
| Taste imparting ingredients (flavours and seasonings, incl. ca. 18% salt) | 26.8 | 20.3 | 20.3 | 20.3 |
| Total (wt %) | 100 | 100 | 100 | 100 |
| After dilution | | | | |
| Viscosity at 70° C. (mPa · s) | 74 | — | — | — |
| Viscosity at 50° C. (mPa · s) | 108 | | | |
| Viscosity at 20° C. (mPa · s) | 190 | — | — | — |

Preparation Method:

Products were prepared according to the list in Table 4. Gellan was high acyl (Kelcogel cp kelco) and alginate was from Danisco (Alginate Grindsted FD 155, Danisco). Starches were common native corn, potato and tapioca starch.

Cold water was weighed in a glass jar of approximately 800 ml. All other ingredients, except the added thickeners (gellan and/or alginate and/or starch) were added weighted and added simultaneously to the water while stirring with an overhead stirrer (IKA RW 16 basic). The stirring was kept at room temperature for at least 30 min. prior heating. The mixture was subsequently transferred to a water bath kept at 87° C. and kept at this temperature for at least 30 min, also ensuring that the mixture was at 85° C. for at least 3 min.

The mixture was then cooled while stirring to 60-58° C. and the salt-sensitive gum or starch (when present) was added while stirring to obtain a homogeneous mixture. The mixtures were stirred until the temperature reached to 54° C. When the temperature reached 54° C. (target) the stirring was then ceased. In the case of examples 4B-D, the temperature eventually dropped to <54° C. (approximately 50-51° C.) because of the large amount of starch which was added. This is not desired, since stirring at a temperature below the setting temperature of the gel, disturbs the network formation. The mixture was then cooled quiescently to room temperature and analysed. The viscosities, were measured according to the method described in the example 1.

Compositions 4A was a shape stable semi-solid food concentrate in the form of a gel. The composition in example 4A after dilution (19.3 g diluted in 250 g water) provided a smooth gravy composition with no starch added (4A). The composition of Example 4B became a paste after cooling, i.e. was not a gel. The compositions of examples 4C and 4D were not possible to prepare without complications. The starch in the mixtures swelled (i.e. gelatinized) within the temperature frame of addition of starch and setting of the xanthan-LBG (60-50° C.) gel, resulting in a very high viscosity of the product. The final product was too hard to be spooned.

When starch was added in the beginning of the process, together with the gelling system, a composition could not be prepared using the conventional preparation procedure. After less than 10 min of being transferred to the water bath for pasteurization, the viscosity increase was so high that the overhead stirrer was not able to stir the mixture (data not shown).

Example 5

Semi-Solid Composition in the Form of a Paste

Compositions were prepared using the ingredients summarised in Table 5.

TABLE 5

|  | Comp. Ex. 5A | Ex. 5B | Ex. 5C |
|---|---|---|---|
| Salt-stable structuring material (citrus fibre) | 3% | 3% | 3% |
| NaCl | 15% | 13% | 13% |
| Sunflower Oil | 15% | 13% | 13% |
| Water | 67% | 67% | 67% |
| Alginate (salt-sensitive gum) | 0% | 0% | 3% |
| HA gellan (salt-sensitive gum) | 0% | 3% | 0% |
| Total (wt %) | 100% | 100% | 100% |
| G'/G" | >5 | >5 | >5 |

Preparation:

A premixture was prepared comprising water, 25 wt % of salt and either high acyl (HA) gellan (Kelcogel LT 100) (Example B) or alginate (high mannuronate, FD 155 Danisco) (Example C) as salt-sensitive gums. The precipitate of salt-sensitive gum (about 25 wt %, based on the weight of the pre-mixture) was filtered to remove most of the water. The precipitate that remained on the filter (salted-out, precipitated gum) was used in the compositions of Examples B and C.

Citrus fibre, a type of plant fibre, was used as a salt-stable structuring material. It was dispersed in water using mixing with medium shear (e.g. Silverson) until the fibre was fully swollen. A pre-emulsion with fibre and oil was prepared in the Silverson mixer, by slowly adding the oil. Then NaCl was added to the fibre-oil emulsion and the resulting mixture was mixed for 30 min. with an overhead stirrer to solubilise the salt. Precipitated salt-sensitive gum (when present) was added. The mixture was homogenized n a single stage High Pressure homogenizer (model) at 350 bar.

The resulting semi solid food compositions Examples 5A to C were in the form of a paste.

Dissolution of the paste of Example 5A did not result in a viscous solution. Moreover, the plant fibre formed an unappealing layer on top of the ready to eat end product.

In Example 5B, the paste comprising high acyl gellan was diluted in hot water (boiling) (70 g in 1000 mL) and mixed with a whisk for approximately 30 s to 60 s. A viscous solution was observed. The fibres of the structuring material remained disperse in the ready to eat end product.

In Example C, the paste comprising alginate was diluted in cold water (70 g in 1000 mL) and mixed with a whisk for approximately 30 s to 60 s. A viscous solution was observed.

Example 6

Gelled Food Concentrate with Salt Sensitive Gum Iota-Carrageenan

Jelly food concentrate with xanthan gum-locust bean gum (salt-stable gelling system) and iota-carrageenan (salt sensitive gum). Use of different salts (NaCl, MgCl2, CaSO4, KCl).

Compositions were prepared (Examples 6A and 6B) and the gel strength and viscosity increase after dilution, were compared to a composition without salt-sensitive gum (comparative example 6A).

TABLE 6

|  | 6A Control | 6B |
|---|---|---|
| Salt-sensitive gum (iota) Carrageenan Viscarin SD 389 | 0 | 2.6 |

TABLE 6-continued

|  | 6A Control | 6B |
|---|---|---|
| Water | 53.5 | 52.1 |
| Salt* | 16.1 | 15.6 |
| MgCl2 | 2.7 | 2.6 |
| Salt-stable gelling system  Xanthan | 0.5 | 0.5 |
| LBG | 0.5 | 0.5 |
| Taste imparting ingredients (flavours and seasonings, incl. ca. 15% NaCl) | 26.8 | 26.1 |
| Total wt % Concentrated | 100 | 100 |
| G' at 20° C., relative to Comp. Ex. 5A | 1 | 1.7 |
| G'/G" | 5.6 | 5.6 |
| After dilution** | 23.3 g in 250 ml | 24 g in 250 ml |
| Salt* concentration after dilution | 1.5% | 1.5% |
| MgCl$_2$ concentration after dilution | 0.26% | 0.26% |
| NaCl (from tasting imparting ingredients) concentration after dilution | 0.4% | 0.4% |
| salt-sensitive gum after dilution | 0% | 0.25% |
| Viscosity at 50° C. (mPa · s) | 6 | 45 |
| Viscosity at 20° C. (mPa · s) | 14 | 126 |

*Salt composition: 1% MgCl2, 2% CaSO4, 29% KCl, 67% NaCl
**The dilution ratio is defined in order to provide same amount of ingredients after dilution, except for the salt sensitive gum. All ingredients after dilution (ready to eat) have the same concentration except for the salt sensitive gum.

The gelled food concentrates in the form of a gel according to the recipes in Table 6 were prepared in the following way. Approximately 200 g of the recipes 6A and 6B were prepared.

Water was weighed in a glass jar and stirred with a magnetic stirrer. Subsequently, salts (Salt composition*and MgCl$_2$), salt-sensitive biopolymer carrageenan (when present—6B), the salt-stable gelling system (xanthan and locus bean gum), flavours and seasonings were added water while stirring in order to obtain a homogeneous mixture. The mixture was then transferred to a controlled temperature water bath at ~87° C. and the final mixture was heated up to 85° C. and kept at this temperature for at least 3 min. The mixture was then cooled quiescently to gel and analysed.

For Example 6B, salt sensitive gum carrageenan (iota, Viscarin SD 389, FMC Biopolymer) was used.

The viscosities in Table 6 were measured with the method described in Example 1. Elastic moduli (G') and viscous moduli (G"), were also measured using the method described in the Example 1.

A homogeneous gelled food concentrate comprising the salt-sensitive gum iota carrageenan was obtained, according to the invention (6B). Example 6B showed a gel strength (G' in Pa) which was comparable to the control sample (6A). Compared with comparative Example 6A, Example 6B provided a higher viscosity in the ready to eat end product, after dilution.

Example 7

Gelled Food Concentrate with Salt Sensitive Gum Gellan+Lambda-Carrageenan

Concentrated gelled food compositions with xanthan gum-locust bean gum (salt-stable gelling system), gellan and carrageenan (salt sensitive gums). Use of different salts (NaCl, MgCl$_2$, CaSO$_4$, KCl).

Gelled compositions were prepared (Examples 7A and 7B) and viscosity increase after dilution was compared to a composition without salt-sensitive gum (comparative example 7A).

TABLE 7

|  | 7A Control | 7B |
|---|---|---|
| HA Gellan Kelcogel LT 100 (salt-sensitive gum) | — | 1 |
| (lambda) Carrageenan Lactarin MV 306 (salt-sensitive gum) | — | 9.9 |
| Water | 58.0 | 51.7 |
| Salt* | 13.8 | 12.3 |
| KCl | 2.2 | 2.0 |
| Salt-stable gelling system  Xanthan | 0.6 | 0.5 |
| LBG | 0.6 | 0.5 |
| Taste imparting ingredients (flavours and seasonings, incl. ca. 15% NaCl) | 24.9 | 22.2 |
| Total wt % Concentrated (gelled) | 100 | 100 |
| G'/G" | 10 | 4 |
| After dilution** | 18.1 g in 250 ml | 20.3 g in 250 ml |
| Salt* concentration after dilution | 1.0% | 1.0% |
| KCl concentration after dilution | 0.16% | 0.16% |
| NaCl (from tasting imparting ingredients) concentration after dilution | 0.27% | 0.27% |
| Salt-sensitive gums after  Gellan (% wt) dilution | — | 0.08% |
| Carrageenan (% wt) | — | 0.8% |
| Viscosity at 70° C. (mPa · s) | 2 | 20 |
| Viscosity at 50° C. (mPa · s) | 5 | 36 |
| Viscosity at 20° C. (mPa · s) | 9 | 87 |

*Salt composition:: 1% MgCl2, 2% CaSO4, 29% KCl, 67% NaCl
**The dilution ratio is defined in order to provide same amount of ingredients after dilution, except for the salt sensitive gum. All ingredients after dilution (ready to eat product) have the same concentration except for the salt sensitive gum.

The sauce concentrates in the form of a gel according to the recipes in Table 7 were prepared in the following way, in a Thermomix TM31 equipment (Vorwerk, Germany). Approximately 500 g of the recipes in Table 7 were prepared.

Water was added to the equipment vessel

All ingredients (salts, salt sensitive gums-when present, salt stable gums and tasting imparting components) were added quickly (30 sec) via the vessel opening at speed 5-6.

The mixture was heated up to 85° C. and kept at this temperature for at least 3 min while stirring (speed 5-6).

The resulting mixture was hot filled in glass or plastic containers, cooled quiescently to gel and analysed.

For Example 7B, salt sensitive gums Carrageenan (lambda, Lactarin MV 306, FMC Biopolymer) and High Acyl gellan (Kelcogel LT 100, CP Kelco) were used.

The viscosities in Table 7 were measured with the method described in Example 1. Elastic moduli (G') and viscous moduli (G"), were also measured using the method described in the Example 1.

A homogeneous gelled food concentrate comprising salt-sensitive gums high acyl gellan and (lambda) carrageenan was obtained, according to the invention (7B). Compared with comparative Example 7A, after dilution Example 7B provided a higher viscosity at 70, 50 and 20° C. in the ready to eat end product.

Example 8

Gravy Jelly Concentrate with Acid-Treated Modified Starch (E-Number 1401) (Salt-Stable Gelling System) and Gellan (Salt Sensitive Gums)

Gelled compositions were prepared (Examples 8A and 8B) and viscosity increase after dilution was compared to a composition without salt-sensitive gum (comparative example 8A).

TABLE 8

|  | 8A Control | 8B |
|---|---|---|
| HA Gellan Kelcogel LT 100 (salt-sensitive gum) | — | 1.4 |
| Water | 51.2 | 50.5 |
| NaCl | 13.2 | 13 |
| Salt-stable gelling system Acid-treated modified starch (E1401) | 13.7 | 13.5 |
| Taste imparting ingredients (flavours and seasonings, incl. ca. 15% NaCl) | 22.0 | 21.6 |
| Total wt % | 100 | 100 |
| After dilution* | 20 g in 250 ml | 20.3 g in 250 ml |
| NaCl concentration after dilution (including NaCl from taste imparting ingredients) | 1.3% | 1.3% |
| salt-sensitive gum after dilution HA Gellan Kelcogel LT 100 | — | 0.11% |
| Viscosity at 70° C. (mPa · s) | 0.3 | 41 |
| Viscosity at 50° C. (mPa · s) | 0.6 | 58 |
| Viscosity at 20° C. (mPa · s) | 2 | 63 |

*The dilution ratio is defined in order to provide same amount of ingredients after dilution, except for the salt sensitive gum. All ingredients after dilution (ready to eat) have the same concentration except for the salt sensitive gum The gravy concentrates in the form of a gel according to the recipes in Table 8 were prepared in the following way in a Thermomix TM31 equipment (Vorwerk, Germany). Approximately 500 g of the recipes in Table 8.

Water is added to the equipment vessel

All ingredients (salts, salt sensitive gums—when present, salt stable gums and tasting imparting components were added quickly (30 sec) via the vessel opening at speed 5-6.

The mixture was heated up to 85° C. and kept at this temperature for at least 3 min while stirring (speed 5-6).

The resulting mixture was hot filled in glass or plastic containers, cooled quiescently to gel and analysed.

For Example 8B, salt sensitive gums High Acyl gellan (Kelcogel LT 100, CP Kelco) was used. Salt stable gelling system was Modified starch (Acid treated—E1401, National starch, Flojel 70). Another acid thin gelling starch was used as salt-stable gelling system, Elastigel 1000J (National Starch) which resulted in comparable results.

The viscosities in Table 8 were measured with the method described in Example 1.

A homogeneous gelled food concentrate comprising salt-sensitive gums high acyl gellan was obtained, according to the invention (8B). Compared with comparative Example 8A, after dilution Example 8B provided a higher viscosity at 70, 50 and 20° C. in the ready to eat end product.

Example 9

Gravy Jelly Concentrate with Xanthan-Locust Bean Gum (Salt-Stable Gelling System) and High Mannuronate Alginate (Salt Sensitive Gum). Use of Different Salts (NaCl, MgCl2, CaSO4, KCl)

Gelled compositions were prepared (Examples 9A and 9B) and viscosity increase after dilution was compared to a composition without salt-sensitive gum (comparative example 9A).

TABLE 9

|  |  | 9A Control | 9B |
|---|---|---|---|
| High Mannuronate Alginate (Kelcosol) | | — | 7.8 |
| Water | | 59.3 | 54.9 |
| Salt* | | 14.1 | 13 |
| Salt-stable gelling system | Xanthan | 0.6 | 0.5 |
|  | LBG | 0.6 | 0.5 |
| Taste imparting ingredients (flavours and seasonings, incl. ca. 15% salt) | | 25.4 | 23.4 |
| Total wt % Concentrate | | 100 | 100 |
| G'/G" | | >10 | >3 |
| After dilution** | | 29.6 g in 250 ml | 32 g in 250 ml |
| Salt* concentration after dilution | | 1.7% | 1.7% |
| NaCl (from tasting imparting ingredients) concentration after dilution | | 0.4% | 0.4% |
| salt-sensitive gum after dilution Alginate (Kelcosol) | | — | 1.1% |
| Viscosity at 70° C. (mPa · s) | | 4 | 22 |
| Viscosity at 50° C. (mPa · s) | | 11 | 52 |
| Viscosity at 20° C. (mPa · s) | | 19 | 94 |

*Salt composition:: 1% MgCl2, 2% CaSO4, 29% KCl, 67% NaCl
**The dilution ratio is defined in order to provide same amount of ingredients after dilution, except for the salt sensitive gum. All ingredients after dilution (ready to eat) have the same concentration except for the salt sensitive gum.

The gravy concentrates in the form of a gel according to the recipes in Table 9 were prepared in the following way in a Thermomix TM31 equipment (Vorwerk, Germany). Approximately 500 g of the recipes in Table 9.

Water is added to the equipment vessel

All ingredients (salts, salt sensitive gums, salt stable gums and tasting imparting components were added quickly (30 sec) via the vessel opening at speed 5-6.

The mixture was heated up to 85° C. and kept at this temperature for at least 3 min while stirring (speed 5-6).

The resulting mixture was flowable and hot filled in glass or plastic containers, cooled quiescently to gel and analysed.

For Example 9B, salt sensitive gum High mannuronate Alginate (Kelcosol, FMC biopolymer) was used.

The viscosities in Table 9 were measured with the method described in Example 1. Elastic moduli (G') and viscous moduli (G"), were also measured using the method described in the Example 1.

A homogeneous gelled food concentrates comprising precipitated salt-sensitive gum alginate was obtained, according to the invention (9B). Compared with comparative Example 9A, after dilution Example 9B provided a higher viscosity at 70, 50 and 20° C. in the ready to eat end product.

Example 10

Sauce Jelly Concentrate with Xanthan-Locust Bean Gum (Salt-Stable Gelling System) and (Lambda) Carrageenan (Salt Sensitive Gum). Use of Different Salts (NaCl, MgCl$_2$, CaSO$_4$, KCl)

Gelled compositions were prepared (Examples 10A and 10B) and viscosity increase after dilution was compared to a composition without salt-sensitive gum (comparative example 10A).

TABLE 10

|  | 10A (same as 6A Control) | 10B |
|---|---|---|
| Salt-sensitive gum Lambda carrageenan (Lactarin MV 306) | — | 5.2 |
| Water | 53.5 | 52.1 |
| Salt* | 16.2 | 15.6 |
| MgCl$_2$ | 2.7 | 2.6 |
| Salt-stable gelling system  Xanthan | 0.5 | 0.5 |
|  LBG | 0.5 | 0.5 |
| Taste imparting ingredients (flavours and seasonings, incl. ca. 15% salt) | 26.8 | 26.1 |
| Total wt % | 100 | 100 |
| Concentrate | 24 g in 250 ml | 25 g in 250 ml |
| G'/G" | 5.6 | 6.1 |
| After dilution** | 24 g in 250 ml | 25 g in 25 ml |
| Salt* concentration after dilution | 1.5% | 1.5% |
| MgCl2 concentration after dilution | 0.26% | 0.26% |
| NaCl (from tasting imparting ingredients) concentration after dilution | 0.4% | 0.4% |
| salt-sensitive gum after dilution | — | 0.5 |
| Viscosity at 20° C. (mPa · s) | 14 | 29 |

*Salt composition:: 1% MgCl$_2$, 2% CaSO$_4$, 29% KCl, 67% NaCl
**The dilution ratio is defined in order to provide same amount of ingredients after dilution, except for the salt sensitive gum. All ingredients after dilution (ready to eat) have the same concentration except for the salt sensitive gum.

The gravy concentrates in the form of a gel according to the recipes in Table 10 were prepared in the following way. Approximately 200 g of the recipes 10A and 10B were prepared.

Water was weighed in a glass jar and stirred with a magnetic stirrer. Subsequently, salts (Salt composition*and MgCl$_2$), salt-sensitive biopolymer carrageenan (when present—10B), the salt-stable gelling system, flavours and seasonings were added water while stirring in order to obtain an homogeneous mixture. The mixture was then transferred to a controlled temperature water bath at ~87° C., and the final mixture was heated up to 85° C. and kept at this temperature for at least 3 min. The mixture was then cooled quiescently to gel and analysed.

For Example 10B, salt sensitive gum salt sensitive gum carrageenan (lambda, Lactarin MV 306, FMC Biopolymer) was used.

The viscosities in Table 10 were measured with the method described in Example 1. Elastic moduli (G') and viscous moduli (G"), were also measured using the method described in the Example 1.

A homogenenous gelled food concentrates comprising the salt-sensitive gum lambda carrageenam was obtained, according to the invention (10B). Example 10B (this invention) showed a gel strength (G' in Pa) which was comparable to the control sample (10A). Compared with comparative Example 10A, after dilution Example 10B provided a higher viscosity at 20° C. in the ready to eat end product.

Example 11

Gravy Jelly Food Concentrates with Xanthan-Locust Bean Gum (Salt-Stable Gelling System) and (Kappa) Carrageenan (Salt Sensitive Gum). Use of Different Salts (NaCl, KCl)

Gelled compositions were prepared (Examples 11A and 11B) and viscosity increase after salt-sensitive gum was compared to a composition without salt-sensitive gum (comparative example 11A).

TABLE 11

|  | 11A Control | 11B |
|---|---|---|
| Kappa carrageenan | — | 4.1 |
| Water | 59.5 | 57.1 |
| NaCl | 10.1 | 9.7 |
| KCl | 3.9 | 3.8 |
| Salt-stable gelling system  Xanthan | 0.5 | 0.5 |
|  LBG | 0.5 | 0.5 |
| Taste imparting ingredients (flavours and seasonings, incl. ca. 14.8% salt) | 25.4 | 24.3 |
| Total wt % | 100 | 100 |
| Concentrate |  |  |
| G' at 20° C., relative to Comp. Ex. 10A | 1 | 3.5 |
| G'/G" | >15 | >10 |
| After dilution** | 17.8 g in 250 ml | 18.5 g in 250 ml |
| NaCl concentration after dilution (including NaCl in Taste imparting ingredients) | 1 | 0.7 |
| KCl concentration after dilution | 0.3 | 0.3 |
| salt-sensitive gum after dilution (Kappa) | — | 0.3 |
| Viscosity at 20° C. (mPa · s) | 8 | 120 |

The gravy concentrates in the form of a gel according to the recipes in Table 11 were prepared in the following way in a Thermomix TM31 equipment (Vorwerk, Germany). Approximately 500 g of the recipes in Table 11.

Water is added to the equipment vessel

All ingredients (salts, salt sensitive gums, salt stable gums and tasting imparting components were added quickly (30 sec) via the vessel opening at speed 5-6.

The mixture was heated up to 85° C. and kept at this temperature for at least 3 min while stirring (speed 5-6).

The resulting mixture was hot filled in glass or plastic containers, cooled quiescently and analysed.

For Example 11B, salt sensitive gum kappa carrageenan (Fluka 22048, Sigma Aldrich) was used.

The viscosities in Table 11 were measured with the method described in Example 1. Elastic moduli (G') and viscous moduli (G"), were also measured using the method described in the Example 1.

A homogeneous gelled food concentrates comprising precipitated salt-sensitive gum alginate was obtained, according to the invention (11B). Compared with comparative Example 11A, after dilution Example 11B provided a higher viscosity at 20° C. in the ready to eat end product.

Example 12

Concentrated Gravy Semi-Solid Compositions with Xanthan Gum (Salt-Stable Structurant) and Kappa-Carrageenan (Salt Sensitive Gum). Use of Different Salts (NaCl, KCl)

Compositions were prepared (Examples 12A and 12B) viscosity increase after dilution, were compared to a composition without salt-sensitive gum (comparative example 12A).

TABLE 12

|  | 12A Control | 12B |
|---|---|---|
| Salt-sensitive gum (Kappa) Carrageenan | — | 4.1 |
| Water | 59.5 | 57.1 |

TABLE 12-continued

|  | 12A Control | 12B |
|---|---|---|
| NaCl | 10.1 | 9.7 |
| KCl | 3.9 | 3.8 |
| Salt-stable structurant Xanthan system | 1.1 | 1.1 |
| Taste imparting ingredients (flavours and seasonings, incl. ca. 15% NaCl) | 25.3 | 24.3 |
| Total wt % Concentrated | 100 | 100 |
| G'/G" | 5 | 4.6 |
| After dilution* | 17.8 g in 250 ml | 18.5 in 250 ml |
| KCl concentration after dilution | 0.4% | 0.4% |
| NaCl (from tasting imparting ingredients) concentration after dilution | 1% | 1% |
| salt-sensitive gum after dilution | — | 0.4 |
| Viscosity at 20° C. (mPa · s) | 14 | 170 |

*The dilution ratio is defined in order to provide same amount of ingredients after dilution, except for the salt sensitive gum. All ingredients after dilution (ready to eat) have the same concentration except for the salt sensitive gum.

The gravy concentrates in the form of a semi-solid paste according to the recipes in Table 12 were prepared in the following way in a Thermomix TM31 equipment (Vorwerk, Germany). Approximately 500 g of the recipes in Table 12.
- Water is added to the equipment vessel
- All ingredients (salts, salt sensitive gums, structurant and tasting imparting components were added quickly (30 sec) via the vessel opening at speed 5-6.
- The mixture was heated up to 85° C. and kept at this temperature for at least 3 min while stirring (speed 5-6).
- The resulting mixture was flowable and hot filled in glass or plastic containers, cooled quiescently and analysed.
- For Example 12B, salt sensitive gum carrageenan (kappa, Fluka 22048, Sigma Aldrich) was used.

The viscosities in Table 12 were measured with the method described in Example 1. Elastic moduli (G') and viscous moduli (G"), were also measured using the method described in the Example 1.

A homogeneous semi-solid food concentrate comprising precipitated salt-sensitive gum kappa-carrageenan was obtained, according to the invention (12B). Compared with comparative Example 12A, Example 12B provided a higher viscosity in the ready to eat end product, after dilution at 20° C.

Example 13

Concentrated Gravy Semi-Solid Compositions with Locust Bean Gum (Salt-Stable Structurant) and Iota-Carrageenan (Salt Sensitive Gum). Use of Different Salts (NaCl, MgCl$_2$, CaSO$_4$, KCl)

Compositions were prepared (Examples 13A and 13B) viscosity increase after dilution, were compared to a composition without salt-sensitive gum (comparative example 13A).

TABLE 13

|  | 13A Control | 13B |
|---|---|---|
| Salt-sensitive gum (iota) Carrageenan Viscarin SD 389 | — | 2.6 |
| Water | 56.3 | 54.8 |
| Salt* | 16 | 15.6 |
| MgCl$_2$ | 2.7 | 2.6 |
| Salt-stable Structurants system LBG | 1.1 | 1 |
| Taste imparting ingredients (flavours and seasonings, incl. ca. 15% NaCl) | 24 | 23.4 |
| Total wt % Concentrated | 100 | 100 |
| G'/G" | <1** | 1.6 |
| After dilution** | 23.3 g in 250 ml | 24 in 250 ml |
| MgCl$_2$ concentration after dilution | 0.3% | 0.3% |
| Salt (from taste-imparting ingredients) concentration after dilution | 1.5% | 1.5% |
| NaCl (from taste-imparting ingredients) concentration after dilution | 0.3% | 0.3% |
| salt-sensitive gum after dilution | — | 0.3% |
| Viscosity at 50° C. (mPa · s) | 1.2 | 33 |
| Viscosity at 20° C. (mPa · s) | 2.5 | 68.5 |

*Salt composition: 1% MgCl$_2$, 2% CaSO$_4$, 29% KCl, 67% NaCl
**The dilution ratio is defined in order to provide same amount of ingredients after dilution, except for the salt sensitive gum. All ingredients after dilution (ready to eat) have the same concentration except for the salt sensitive gum.

The gravy concentrates in the form of a semi-solid paste according to the recipes in Table 13 were prepared in the following way in a Thermomix TM31 equipment (Vorwerk, Germany). Approximately 500 g of the recipes in Table 13.
- Water is added to the equipment vessel
- All ingredients (salts, salt sensitive gums, structurant and tasting imparting components were added quickly (30 sec) via the vessel opening at speed 5-6.
- The mixture was heated up to 85° C. and kept at this temperature for at least 3 min while stirring (speed 5-6).
- The resulting mixture was flowable and hot filled in glass or plastic containers, cooled quiescently and analysed.
- For Example 13B, salt sensitive gum carrageenan (iota, Viscarin SD 389) was used.

The viscosities in Table 13 were measured with the method described in Example 1. Elastic moduli (G') and viscous moduli (G"), were also measured using the method described in the Example 1.

A homogeneous semi-solid, paste, food concentrates comprising precipitated salt-sensitive gum iota-carragenan was obtained, according to the invention (13B). Control 13A was not a semi solid (according to this invention). It was a pourable fluid. Compared with comparative Example 13A, Example 13B provided a higher viscosity in the ready to eat end product, after dilution at 20° C.

The invention claimed is:

1. A semi-solid food concentrate in the form of a gel or a paste comprising:
   a) a salt-sensitive gum selected from the group consisting of alginate, gellan, iota-carrageenan, kappa-carrageenan, lambda-carrageenan, and mixtures thereof,
   b) salt in an amount from 8 wt % to 25 wt % based on the weight of the semi-solid food concentrate;
   wherein the amount of the salt is sufficient to keep the salt-sensitive gum in a salted-out state,
   c) a salt-stable structuring material selected from the group consisting of a salt-stable gelling system, gums, vegetable powder, plant puree, plant fibre, fat and mixtures thereof;
   wherein, when the salt-stable gelling system is added to water having a salt content of 8 wt % to 25 wt %, the salt-stable gelling system forms a shape stable gel; and d) water, wherein the semi-solid food concentrate, after dilution in water between 8 and 20 times based on the weight of the semi-solid food concentrate, results in a ready-to-eat end product;

wherein the ready-to-eat end product has a viscosity of greater than 20 mPa·s at 20° C., and wherein the salt-stable structuring material is not konjac mannan alone.

2. The semi-solid food concentrate according to claim 1, wherein the salt-sensitive gum is present in an amount of from 0.2 wt % to 35 wt %, based on the weight of the semi-solid food concentrate, wherein the salt is NaCl wherein the water is present in an amount of from 20 wt % to 91.5 wt %, based on the weight of the semi-solid food concentrate.

3. The semi-solid food concentrate according to claim 1, wherein the salt-stable gelling system comprises at least one of modified starch, gelatin combined with starch, xanthan gum combined with a glucomannan, xanthan gum combined with a galactomannan, and mixtures thereof.

4. The semi-solid food concentrate according to claim 1, wherein the gums comprises at least one of locust bean gum, guar gum, *cassia* gum, tara gum or mixtures thereof.

5. The semi-solid food concentrate according to claim 1, wherein the salt-sensitive gum is selected from the group consisting of alginate, gellan, iota-carrageenan, and mixtures thereof.

6. The semi-solid food concentrate according to claim 1, wherein the salt-sensitive gum is alginate and gellan.

7. The semi-solid food concentrate according to claim 1, wherein an elastic modulus G' of the semi-solid food concentrate is higher than a viscous modulus G" of the semi-solid food concentrate.

8. The semi-solid food concentrate according to claim 1, further comprising starch, wherein a total amount of the gums and the starch together is greater than 4 wt %, based on the weight of the semi-solid food concentrate.

9. The semi-solid food concentrate according to claim 1, further comprising non-gelatinised starch in an amount of from 5 to 30 wt %, based on the weight of the gelled food concentrate.

10. The semi-solid food concentrate according to claim 1, wherein the viscosity of the ready-to-eat end product is 20 mPa·s to 1,000 mPa·s at 20° C.

11. The semi-solid food concentrate according to claim 1, comprising:

wherein the salt-sensitive gum is at least one of 0.2 to 2.0 wt % gellan, 2 and 8 wt % alginate or a mixture thereof, based on the weight of the semi-solid food concentrate, whereby wherein the salt is NaCl and wherein the NaCl is present in an amount of from 9 wt % to 20 wt %, based on the weight of the semi-solid food concentrate, wherein the salt-stable structuring material is xanthan gum and locust bean gum, wherein the xanthan gum and the locust bean gum are present in a total amount of from 0.1 wt % to 10 wt %, based on the weight of the water in of the semi-solid food concentrate, wherein the water is present in an amount of from 20 wt % to 91.5 wt %, based on the weight of the semi-solid food concentrate.

12. The semi-solid food concentrate according to claim 11, wherein NaCl is present in an amount of from 9 wt % to 18 wt %, based on the weight of the semi-solid food concentrate.

13. The semi-solid food concentrate according to claim 11, wherein the salt-stable structuring material is present in an amount of from 0.2 wt % to 7 wt %, based on the weight of the semi-solid food concentrate.

14. The semi-solid food concentrate according to claim 11, wherein the salt-stable structuring material is present in an amount of from 0.5 wt % to 5 wt %, based on the weight of the semi-solid food concentrate.

15. The semi-solid food concentrate according to claim 11, wherein the salt-stable structuring material is present in an amount of from 0.8 wt % to 3 wt %, based on the weight of the semi-solid food concentrate.

16. The semi-solid food concentrate according to claim 11, wherein the water is present in an amount of from 30 wt % to 70 wt %, based on the weight of the semi-solid food concentrate.

17. The semi-solid food concentrate according to claim 11, wherein the water is present in an amount of from 40 wt % to 65 wt %, based on the weight of the semi-solid food concentrate.

* * * * *